(12) United States Patent
Howell

(10) Patent No.: US 6,888,833 B1
(45) Date of Patent: May 3, 2005

(54) SYSTEM AND METHOD FOR PROCESSING CALL SIGNALING

(75) Inventor: Royal Dean Howell, Trimble, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 09/219,096

(22) Filed: Dec. 22, 1998

(51) Int. Cl.[7] .............................. H04J 3/16; H04J 3/22; H04J 3/12
(52) U.S. Cl. .................. 370/395.2; 370/467; 370/522
(58) Field of Search ................. 370/467, 395.2, 370/352–357, 360, 429, 522

(56) References Cited

U.S. PATENT DOCUMENTS

| | | |
|---|---|---|
| 4,201,889 A | 5/1980 | Lawrence et al. |
| 4,348,554 A | 9/1982 | Asmuth |
| 4,720,850 A | 1/1988 | Oberlander |
| 4,748,658 A | 5/1988 | Gopal et al. |
| 4,763,317 A | 8/1988 | Lehman |
| 4,926,416 A | 5/1990 | Weik |
| 4,979,118 A | 12/1990 | Kheradpir |
| 4,991,204 A | 2/1991 | Yamamoto et al. |
| 5,048,081 A | 9/1991 | Gavaras et al. |
| 5,051,983 A | 9/1991 | Kammerl |
| 5,067,123 A | 11/1991 | Hyodo et al. |
| 5,084,867 A | 1/1992 | Tachibana et al. |
| 5,089,954 A | 2/1992 | Rago |
| 5,091,903 A | 2/1992 | Schrodi |
| 5,101,404 A | 3/1992 | Kunimoto et al. |
| 5,115,427 A | 5/1992 | Johnson, Jr. et al. |
| 5,130,974 A | 7/1992 | Kawamura et al. |
| 5,168,492 A | 12/1992 | Beshai et al. |
| 5,182,550 A | 1/1993 | Masuda et al. |
| 5,185,743 A | 2/1993 | Murayama et al. |
| 5,204,857 A | 4/1993 | Obara |
| 5,216,669 A | 6/1993 | Hofstetter et al. |
| 5,218,602 A | 6/1993 | Grant et al. |
| 5,239,539 A | 8/1993 | Uchida et al. |
| 5,249,178 A | 9/1993 | Kurano et al. |
| 5,251,255 A | 10/1993 | Epley |
| 5,255,266 A | 10/1993 | Watanabe et al. |

(Continued)

OTHER PUBLICATIONS

McDysan, David E. and Spohn, Darren L., ATM Theory And Application, 1994, p. 256: 9.3.1; ATM Layer VPI/VCI Level Addressing.

(Continued)

*Primary Examiner*—Seema S. Rao
*Assistant Examiner*—Kevin C. Harper

(57) ABSTRACT

A system and method for transmitting, receiving, generating, and processing call signaling comprises a signaling point to receive and transmit call signaling over access links to, for example, time division multiplex (TDM) communication devices. A signaling interface receives and processes message parameters and call signaling and transmits call signaling and message parameters between the signaling point and a call processor. A call processor processes call signaling and can transmit call signaling message parameters to an asynchronous transfer mode (ATM) matrix for transmission through an ATM network or to the signaling interface for transmission of call signaling messages from the signaling point. An ATM matrix transmits call signaling message parameters on designated virtual paths/virtual connections (VP/VCs) to communication devices.

10 Claims, 18 Drawing Sheets

U.S. PATENT DOCUMENTS

| | | |
|---|---|---|
| 5,268,895 A | 12/1993 | Topper |
| 5,282,244 A | 1/1994 | Fuller et al. |
| 5,289,536 A | 2/1994 | Hokari |
| 5,291,492 A | 3/1994 | Andrews et al. |
| 5,327,421 A | 7/1994 | Hiller et al. |
| 5,339,318 A | 8/1994 | Tanaka et al. |
| 5,345,443 A | 9/1994 | D'Ambrogio et al. |
| 5,345,445 A | 9/1994 | Hiller et al. |
| 5,345,446 A | 9/1994 | Hiller et al. |
| 5,357,510 A | 10/1994 | Norizuki et al. |
| 5,363,433 A | 11/1994 | Isono |
| 5,365,524 A | 11/1994 | Hiller et al. |
| 5,367,566 A | 11/1994 | Moe et al. |
| 5,384,771 A | 1/1995 | Isidoro et al. |
| 5,384,840 A | 1/1995 | Blatchford et al. |
| 5,392,402 A | 2/1995 | Robrock, II |
| 5,394,398 A | 2/1995 | Rau |
| 5,418,783 A | 5/1995 | Yamaki et al. |
| 5,420,857 A | 5/1995 | Jurkevich |
| 5,420,916 A | 5/1995 | Sekiguchi |
| 5,422,882 A | 6/1995 | Hiller et al. |
| 5,426,636 A | 6/1995 | Hiller et al. |
| 5,428,607 A | 6/1995 | Hiller et al. |
| 5,428,609 A | 6/1995 | Eng et al. |
| 5,434,852 A | 7/1995 | La Porta et al. |
| 5,446,738 A | 8/1995 | Kim et al. |
| 5,452,296 A | 9/1995 | Shimizu |
| 5,452,297 A | 9/1995 | Hiller et al. |
| 5,459,721 A | 10/1995 | Yoshida |
| 5,461,669 A | 10/1995 | Vilain |
| 5,469,501 A | 11/1995 | Otsuka |
| 5,473,677 A | 12/1995 | D'Amato et al. |
| 5,473,679 A | 12/1995 | La Porta et al. |
| 5,479,401 A | 12/1995 | Bitz et al. |
| 5,483,527 A | 1/1996 | Doshi et al. |
| 5,495,484 A | 2/1996 | Self et al. |
| 5,497,373 A | 3/1996 | Hulen et al. |
| 5,499,290 A | 3/1996 | Koster |
| 5,509,010 A | 4/1996 | La Porta et al. |
| 5,513,180 A | 4/1996 | Miyake et al. |
| 5,513,355 A | 4/1996 | Doellinger et al. |
| 5,526,359 A | 6/1996 | Read et al. |
| 5,530,698 A | 6/1996 | Kozaki et al. |
| 5,539,815 A | 7/1996 | Samba |
| 5,539,884 A | 7/1996 | Robrock, II |
| 5,541,917 A | 7/1996 | Farris |
| 5,541,918 A | 7/1996 | Ganmukhi et al. |
| 5,550,914 A | 8/1996 | Clarke et al. |
| 5,568,475 A | 10/1996 | Doshi et al. |
| 5,579,311 A | 11/1996 | Chopping et al. |
| 5,583,849 A | 12/1996 | Ziemann et al. |
| 5,602,841 A | 2/1997 | Kebizay et al. |
| 5,623,491 A | 4/1997 | Skoog |
| 5,629,930 A | 5/1997 | Beshai et al. |
| 5,636,210 A | 6/1997 | Agrawal et al. |
| 5,703,876 A | 12/1997 | Christie |
| 5,719,863 A | 2/1998 | Hummel |
| 5,765,108 A | 6/1998 | Martin et al. |
| 5,787,086 A | 7/1998 | McClure et al. |
| 5,805,568 A | 9/1998 | Shinbashi |
| 5,825,780 A | 10/1998 | Christie |
| 5,844,895 A | 12/1998 | Gradisching |
| 5,920,562 A * | 7/1999 | Christie et al. ............. 370/395 |
| 5,926,482 A | 7/1999 | Christie |
| 5,940,393 A | 8/1999 | Duree et al. |
| 5,940,491 A | 8/1999 | Anderson et al. |
| 5,953,338 A | 9/1999 | Ma et al. |
| 5,982,783 A | 11/1999 | Frey et al. |
| 5,991,301 A | 11/1999 | Christie |
| 5,999,525 A | 12/1999 | Krishnaswamy et al. |
| 6,002,689 A * | 12/1999 | Christie et al. ............. 370/401 |
| 6,005,845 A | 12/1999 | Svennesson et al. |
| 6,009,100 A * | 12/1999 | Gausmann et al. ......... 370/397 |
| 6,016,319 A | 1/2000 | Kshirsagar et al. |
| 6,016,343 A | 1/2000 | Hogan et al. |
| 6,023,474 A | 2/2000 | Gardner |
| 6,026,091 A | 2/2000 | Christie et al. |
| 6,031,840 A | 2/2000 | Christie |
| 6,081,529 A | 6/2000 | Christie |
| 6,098,094 A | 8/2000 | Barnhouse et al. |
| 6,137,800 A | 10/2000 | Wiley et al. |
| 6,169,735 B1 * | 1/2001 | Allen et al. ................. 370/352 |
| 6,181,703 B1 | 1/2001 | Christie et al. |
| 6,298,043 B1 | 10/2001 | Mauger et al. |
| 6,314,103 B1 * | 11/2001 | Medhat et al. ............. 370/352 |
| 6,324,179 B1 | 11/2001 | Doshi et al. |

OTHER PUBLICATIONS

Choi, Requirements For ATM Trunking, ATM Forum Technical Committee 95–1401, Oct. 2–6, 1995.

Ohta, S., et al., A Dynamically Controllable ATM Transport Network Based On The Virtual Path Concept, pp. 1272–1276, Communications For The Information Age, Globecom '88, Conference Record, vol. III, Nov. 28–Dec. 1, 1988.

Duault, Proposal For ATM Trunking Options, ATM Forum Technical Committee, 95–1230, Oct. 2–6, 1995.

Schink, "CES As A Flexible Trunking Method", ATM Forum Technical Committee 95–1157, Oct. 2–6, 1995.

Caves, Proposed modifications to the baseline text (95–0446R2) of the "VTOA–ATM Trunking For Narrowband Services" Specification, ATM Forum Technical Committee 95–1134, Oct. 2–6, 1995.

Kumar, "SAA/VTOA Legacy Voice Service At A Native ATM Teriminal", ATM Forum Technical Committee 95–0917R1, Oct. 2–6, 1995.

Barr, W.J., et al., The TINA Initiative, IEEE Communications Magazine, vol. 31, No. 3, New York (US), pp. 70–76, Mar. 1993.

Weisser, F. J., et al., The Intelligent Network And Forward–Looking Technology, IEEE Communications Magazine, vol. 26, No. 12, Dec. 1988, New York (US), pp. 64–69, Dec., 1988.

"IN/B–ISDN Signaling Three Ways Of Integration," Study Group 11, Geneva, ITU—Telecommunication Standardization Sector, Nov. 29–Dec. 17, 1993.

General Recommendations On Telephone Switching And Signaling Intelligent Network—Intelligent Network Distributed Functional Plane Architecture, Q.1204, ITU–T—Mar. 1993.

General Recommendations On Telephone Switching And Signaling Intelligent Network—Intelligent Network Physical Plane Architecture Q.1209, ITU–T Recommendation, Telecommunication Standardization Sector of ITU.

Beckman, Richard T. and Matthews, Joseph R., "Proposal For A Physical Archtecture Based On The Harmonized Functional Architecture," Committee T1 Contribution T1S1.5/95–027, Bellcore. Feb. 20, 1995.

Buhrke, Proposed Unified Functional Model, T1S1.5/95–036, Feb. 1995.

Minoli, Daniel/DVI Communications, Inc./Stevens Institute of Technology and Dobrowski, George/Bell Communications Research (Bellcore), Principles Of Signaling For Cell Relay And Frame Relay © pp. 1–2, 5–6 and 229, 1994.

"Networking Signaling," Telephony, TCX12004, University of Excellence, pp 5.8–5.17, Oct. 21, 1991.

McKinney, Scott, "ATM for Narrowband Services" IEEE Communications Magazine, Apr.,, New York, US, pp. 64–72.

Faris, F., A Proposed Architecture for the Transport of Compressed VBR Voice Over ATM, Oct. 1–6, 1995, SAA/VTOA Sub Working Group, pp. 1–4.

Kim, Yung, "Voice and Telephony services for an ATM terminal" ATM Forum Technical Committee Service Aspects and Application Sub–working Group, Oct. 2–7, 1995; Honolulu, Hawaii, pp. 1–4.

Kocan Kristin F., Universal Premises Access to Voice Band and ATM Networks Using a Broadband Interworking Gateway, Bell Labs Technical Journal, Apr.–Jun., 1998, 93–108.

Tanabe, Shirou, Taihei, Suzuki, and Ohtsuki, Ken–Ichi, "A New Distributed Switching System Architecture for B–ISDN," International Conference on Integrated Broadband Services and Networks, Oct. 15–18, 1990, The Institution of Electrical Engineers, Savoy Place, London.

Palmer, Rob, "An Experimental ATM Network Featuring De–Coupled Modular Control," Telecom Australia Research Laboratories (Victoria), pp. 118–122 (Nov., 1992).

Thomas F. Laporta, "Distributed Call Processing for Wireless Mobile Networks," Bell Labs Technical Journal, vol. 1 (No. 1), pp. 127–142, (Oct., 1996).

Palmer, Rob, "An Experimental ATM Network for B–ISDN Research," IEEE Region 10 Conference, Melbourne, Australia, Nov. 1992.

Helen A. Bauer, John J. Kulzer, Edward G. Sable, "Designing Service–Independent Capabilities for Intelligent Networks," IEEE, Dec. 1988, pp. 31–41.

ITU–T Q.1219, "Intelligent Network User's Guide For Capability Set 1," Apr., 1994.

Thorner, "Intelligent Networks, Capter 2," 1994, Artech House, pp. 11–107.

ITU–T, Recommendation Q.722, "Specifications of Signalling System No. 7, General Function of Telephone Messages and Signals," 1993.

Scott D. Hoffpauir, "Application Provider and Method For Communication," H1,895, DSC/Celcore, Inc., Plano, Texas, Oct. 3, 200, U.S. Appl. No. 09/026,230.

Scott D. Hoffpauir, "Network Management System Server and Method for Operation," H1,896, DSC/Celore, Inc., Plano, Texas, Oct. 3, 2000, U.S. Appl. No. 09/026,487.

Anthony G. Fletcher, "Merged Operations and Maintenance Center and Method for Operation, " H1,897, DSC/Celcore, Inc., Plano, Texas, Oct. 3, 2000, U.S. Appl. No. 09/026,809.

* cited by examiner

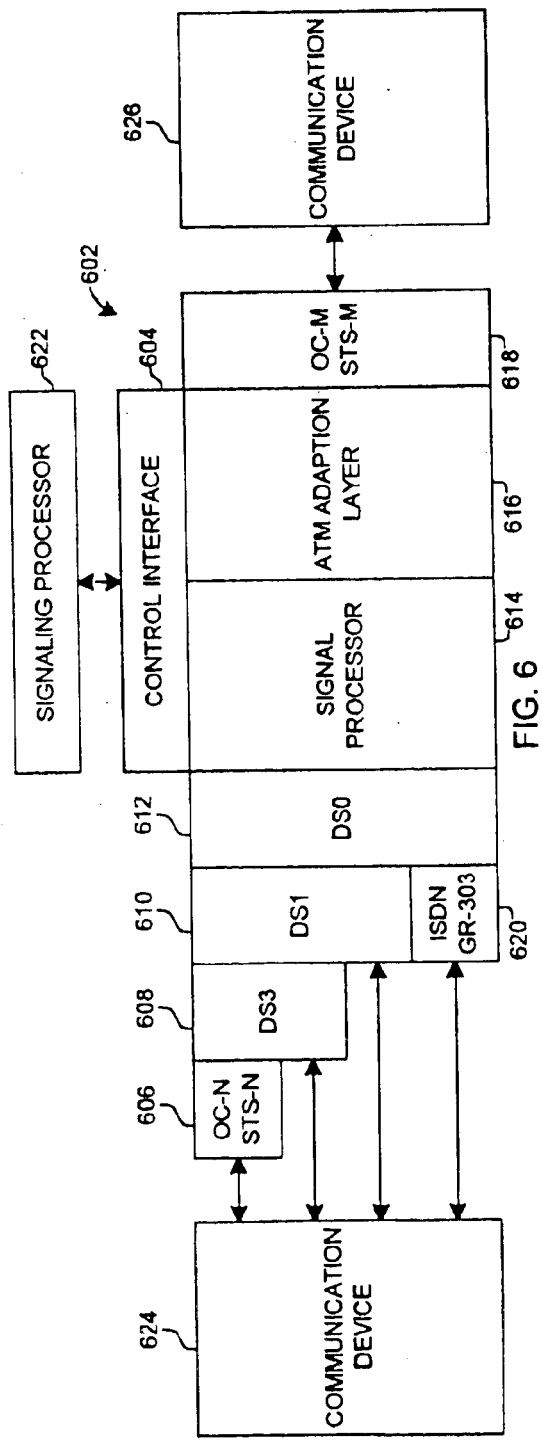
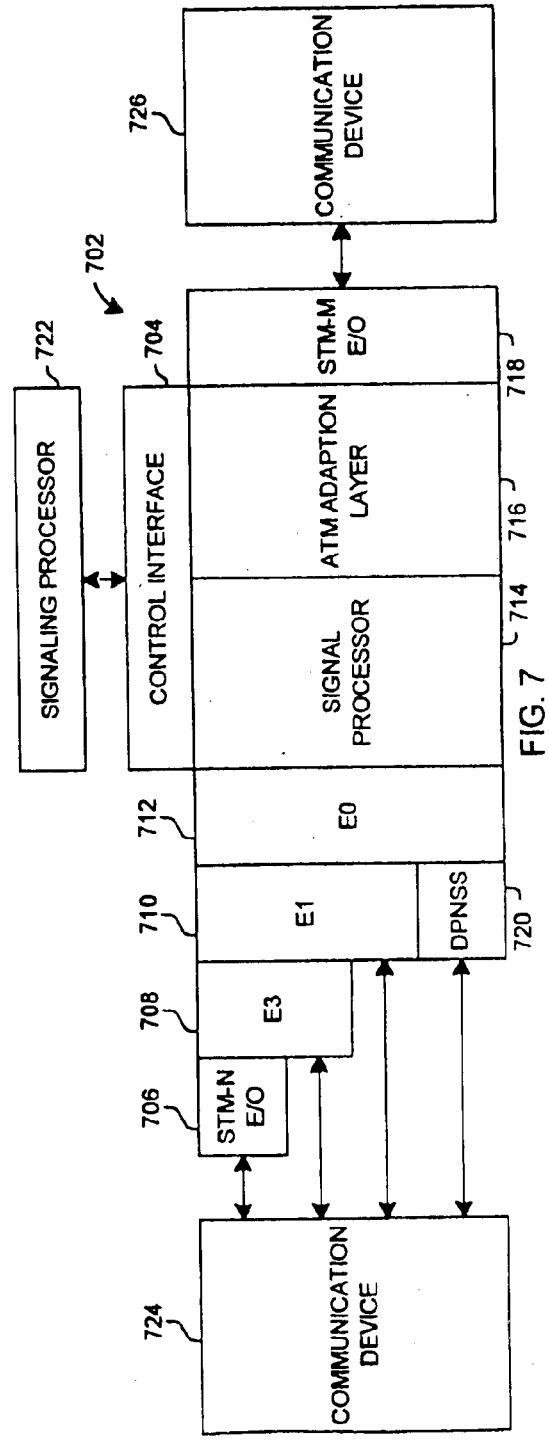

| TRUNK GROUP NUMBER | GROUP MEMBER | TCIC | EC LABEL | IWU LABEL | IWU PORT | DS1/E1 LABEL | DS1/E1 CHANNEL | INITIAL STATE |
|---|---|---|---|---|---|---|---|---|
| | | | | | | | | |
| | | | | | | | | |

FIG. 13

| TRUNK GROUP NUMBER | GROUP SIZE | STARTING CIC | TRANSMIT INTERFACE LABEL | TRANSMIT VPI | RECEIVE INTERFACE LABEL | RECEIVE VPI | INITIAL STATE |
|---|---|---|---|---|---|---|---|
| | | | | | | | |
| | | | | | | | |

FIG. 14

| TRUNK GROUP NUMBER | ADMIN INFORMATION | ASSOCIATED POINT CODE | CLLI | TRUNK TYPE | ASSOCIATED NPA | ASSOCIATED JIP | TIME ZONE LABEL | ECHO CANCELLER INFORMATION |
|---|---|---|---|---|---|---|---|---|
| | | | | | | | | |
| | | | | | | | | |

FIG. 15A

| SATELLITE | SELECT SEQUENCE | IWU PRIORITY | GLARE RESOLUTION | CONTINUITY CONTROL | REATTEMPTS | IGNORE LNP INFORMATION | TREATMENT LABEL | MESSAGE MAPPING LABEL |
|---|---|---|---|---|---|---|---|---|
| | | | | | | | | |
| | | | | | | | | |

FIG. 15B

| QUEUE | RING NO ANSWER | VOICE PATH CUT THROUGH | ORIGINATING COS LABEL | TERMINATING COS LABEL | CALL CONTROL | NEXT FUNCTION | NEXT LABEL |
|---|---|---|---|---|---|---|---|
| | | | | | | | |
| | | | | | | | |

| CARRIER LABEL | CARRIER ID | CARRIER SELECTION | NEXT FUNCTION | NEXT LABEL |
|---|---|---|---|---|
| | | | | |
| | | | | |

FIG. 17

| EXCEPTION LABEL | CALLING PARTY'S CATEGORY | CALLED NUMBER | | NEXT FUNCTION | NEXT LABEL |
|---|---|---|---|---|---|
| | | NATURE OF ADDRESS | DIGITS FROM | DIGITS TO | | |
| | | | | | | |

FIG. 18

| OLI LABEL | ORIGINATION LINE INFORMATION | NEXT FUNCTION | NEXT LABEL |
|---|---|---|---|
| | | | |

FIG. 19

| ANI LABEL | CHARGE CALLING PARTY NUMBER | | TIME ZONE LABEL | CUSTOMER INFORMATION | EC INFORMATION | QUEUE | TREATMENT LABEL | NEXT FUNCTION | NEXT LABEL |
|---|---|---|---|---|---|---|---|---|---|
| | DIGITS FROM | DIGITS TO | | | | | | | |
| | | | | | | | | | |

FIG. 20

| CALLED NUMBER SCREENING LABEL | CALLED NUMBER | | | DELETE DIGITS | NEXT FUNCTION | NEXT LABEL |
|---|---|---|---|---|---|---|
| | NATURE OF ADDRESS | DIGITS FROM | DIGITS TO | | | |
| | | | | | | |

| CALLED NUMBER LABEL | CALLED NUMBER | | | NEXT FUNCTION | NEXT LABEL |
|---|---|---|---|---|---|
| | NATURE OF ADDRESS | DIGITS FROM | DIGITS TO | | |
| | | | | | |

FIG. 21

| DAY OF YEAR LABEL | DATE | NEXT FUNCTION | NEXT LABEL |
|---|---|---|---|
| | | | |

FIG. 22

| DAY OF WEEK | DAY FROM | DAY TO | NEXT FUNCTION | NEXT LABEL |
|---|---|---|---|---|
| | | | | |

FIG. 23

| TIME OF DAY LABEL | TIME FROM | TIME TO | NEXT FUNCTION | NEXT LABEL |
|---|---|---|---|---|
| | | | | |

FIG. 24

| TIME ZONE LABEL | UTC OFFSET | DAYLIGHT SAVINGS |
|---|---|---|
| | | |

FIG. 25

| ROUTING LABEL | ROUTE NUMBER | NEXT FUNCTION | SIGNAL ROUTE LABEL |
|---|---|---|---|
| | | | |

FIG. 26

| ORIGINATING TRUNK COS LABEL | TERMINATING TRUNK COS LABEL | NEXT FUNCTION | NEXT LABEL |
|---|---|---|---|
| | | | |

FIG. 27

| TREATMENT LABEL | ERROR/CAUSE LABEL | NEXT FUNCTION | NEXT LABEL |
|---|---|---|---|
| | | | |

FIG. 28

| OUTGOING RELEASE LABEL | LOCATION | OUTGOING CAUSE VALUE | |
|---|---|---|---|
| | | CODING STANDARD | CAUSE VALUE |
| | | | |

FIG. 29

| PERCENT LABEL | CONTROL PERCENTAGE | CONTROL | | PASSED | |
|---|---|---|---|---|---|
| | | NEXT FUNCTION | NEXT LABEL | NEXT FUNCTION | NEXT LABEL |
| | | | | | |

FIG. 30

| CALL RATE LABEL | CALL RATE | CONTROL | | PASSED | |
|---|---|---|---|---|---|
| | | NEXT FUNCTION | NEXT LABEL | NEXT FUNCTION | NEXT LABEL |
| | | | | | |

FIG. 31

| DATABASE SERVICES LABEL | SERVICE TYPE | SCCP LABEL | TCAP LABEL | NEXT FUNCTION | NEXT LABEL |
|---|---|---|---|---|---|
| | | | | | |

FIG. 32

| SCCP LABEL | MESSAGE TYPE | PROTOCOL CLASS | MESSAGE HANDLING | HOP COUNTER | SEGMENTATION |
|---|---|---|---|---|---|
| | | | | | |

FIG. 33A

| ISNI TYPE | ISNI | | LABEL |
|---|---|---|---|
| | ROUTE INDICATOR | MARK INDICATOR | |
| | | | |

FIG. 33B

| | CALLED PARTY ADDRESS | | | | | | | | | |
|---|---|---|---|---|---|---|---|---|---|---|
| | ADDRESS INDICATOR | | | SUB SYSTEM NUMBER | POINT CODE NUMBER | | GLOBAL TITLE | | | |
| SSN | POINT CODE | GLOBAL TITLE INDICATOR | ROUTING INDICATOR | NATIONAL/ INTERNATIONAL | | | TRANSLATION TYPE | ENCODE SCHEME | NUMBER PLAN | ADDRESS TYPE |
| | | | | | | | | | | |

| | | ADDRESS INDICATOR | | | CALLING PARTY ADDRESS | | GLOBAL TITLE | | |
|---|---|---|---|---|---|---|---|---|---|
| SSN | POINT CODE | GLOBAL TITLE INDICATOR | ROUTING INDICATOR | NATIONAL/ INTERNATIONAL | SUB SYSTEM NUMBER | POINT CODE NUMBER | TRANSLATION TYPE | ENCODE SCHEME | NUMBER PLAN | ADDRESS TYPE |
| | | | | | | | | | | |
| | | | | | | | | | | |

FIG. 34

| ISNI LABEL | NETWORK 1 | NETWORK 2 | NETWORK 3 | NETWORK... | NETWORK 16 |
|---|---|---|---|---|---|
| | | | | | |
| | | | | | |

FIG. 35

| TCAP LABEL | TCAP TYPE | TAG CLASS | PACKAGE TYPE | COMPONENT TYPE | MESSAGE TYPE |
|---|---|---|---|---|---|
| | | | | | |
| | | | | | |

FIG. 36

| ECHO CANCELLER LABEL | ECHO CANCELLER TYPE | RS-232 ADDRESS | MODULE |
|---|---|---|---|
| | | | |
| | | | |

FIG. 37

| IWU LABEL | IWU ID | IP SOCKET 1 | IP SOCKET 2 | IP SOCKET 3 | IP SOCKET 4 |
|---|---|---|---|---|---|
| | | | | | |
| | | | | | |

FIG. 38

| CAM INTERFACE LABEL | CAM LABEL | LOGICAL INTERFACE |
|---|---|---|
| | | |
| | | |

| CAM LABEL | CAM TYPE | CAM ADDRESS |
|---|---|---|
|  |  |  |

FIG. 39

| OFFICE CLLI NAME | SITE NODE ID | ORIGINATION ID | SOFTWARE ID | CALL PROCESSOR ID |
|---|---|---|---|---|
|  |  |  |  |  |

FIG. 40A

| ACC ENABLED | ACL 1 ONSET | ACL 1 ABATE | ACL 2 ONSET | ACL 2 ABATE | ACL 3 ONSET | ACL 3 ABATE |
|---|---|---|---|---|---|---|
|  |  |  |  |  |  |  |

FIG. 40B

| MAX TRUNKS OHQ | OHQ TQ1 | OHQ TQ2 | RING NO ANSWER TIMER | BILLING ACTIVE | NWM ALLOW | BILLING FAILURE FREE CALL |
|---|---|---|---|---|---|---|
|  |  |  |  |  |  |  |

FIG. 40C

| MAX HOP COUNTS | MAX TABLE LOOKUPS |
|---|---|
|  |  |

FIG. 40D

| AIN EVENT PARAMETERS LABEL | MESSAGE NAME #1 | MESSAGE NAME #.... | MESSAGE NAME #N |
|---|---|---|---|
| ACCESS CODE | | | |
| ACG ENCOUNTERED | | | |
| ALTERNATE BILLING INDICATOR | | | |
| ALTERNATE TRUNK GROUP | | | |
| AMA ALTERNATE BILLING NUMBER | | | |
| AMA BUSINESS CUSTOMER ID | | | |
| AMA DIGITS DIALED WC | | | |
| AMA LINE NUMBER | | | |
| AMA SLPID | | | |
| AMP | | | |
| ANSWER INDICATOR | | | |
| BEARER CAPABILITY | | | |
| BUSY CAUSE | | | |
| CALLED PARTY ID | | | |
| CALLED PARTY STATION TYPE | | | |
| CALLING PARTY BGID | | | |
| CARRIER | | | |
| CHARGE NUMBER | | | |
| CHARGE PARTY STATION TYPE | | | |
| CLEAR CAUSE | | | |
| COLLECTED ADDRESS INFORMATION | | | |
| COLLECTED DIGITS | | | |
| CONTROLLING LEG TREATMENT | | | |
| DISCONNECT FLAG | | | |
| DISPLAY TEXT | | | |
| FACILITY GID (TRUNK GROUP ID) | | | |
| FACILITY GID (PRIVATE FACILITY GID) | | | |
| FACILITY GID (ROUTE INDEX) | | | |
| FACILITY MEMBER ID | | | |
| FAILURE CAUSE | | | |
| GENERIC NAME | | | |
| ISDN INTERFACE ID | | | |
| LATA | | | |
| ORIGINAL CALLED PARTY ID | | | |
| OUTPULSE NUMBER | | | |
| OVERFLOW BILLING NUMBER | | | |
| PASSIVE LEG TREATMENT | | | |
| PRIMARY BILLING INDICATOR | | | |
| PRIMARY CARRIER | | | |
| PRIMARY TRUNK GROUP | | | |
| REDIRECTING PARTY ID | | | |
| REDIRECTION INFORMATION | | | |
| RESOURCE TYPE | | | |
| SECOND ALTERNATE BILLING INDICATOR | | | |
| SECOND ALTERNATE CARRIER | | | |
| SECOND ALTERNATE TRUNK GROUP | | | |
| SPID | | | |
| STR PARAMETER BLOCK | | | |

FIG. 41A

| AIN EVENT PARAMETERS LABEL | MESSAGE NAME #1 | MESSAGE NAME #.... | MESSAGE NAME #N |
|---|---|---|---|
| TCM | | | |
| TRIGGER CRITERIA TYPE | | | |
| USER ID | | | |
| VERTICAL SERVICE CODE | | | |
| APPLICATION ERROR STRING | | | |
| ERROR CAUSE | | | |
| FAILED MESSAGE | | | |
| CONNECT TIME | | | |
| CONTROL CAUSE INDICATOR | | | |
| ECHO DATA | | | |
| FACILITY STATUS | | | |
| GAP DURATION | | | |
| GAP INTERVAL (NATIONAL GAP INTERVAL) | | | |
| GAP INTERVAL (PRIVATE GAP INTERVAL) | | | |
| GLOBAL TITLE VALUE | | | |
| MONITOR TIME | | | |
| STATUS CAUSE | | | |
| TERMINATION INDICATOR | | | |
| TRANSLATION TYPE | | | |
| TRIGGER CRITERIA FLAG | | | |

FIG. 41B

| MESSAGE TYPE | PARAMETERS | INDEX #1 | INDEX #.... | INDEX #N |
|---|---|---|---|---|
| ADDRESS COMPLETE | BACKWARD CALL INDICATOR | | | |
| | ACCESS TRANSPORT | | | |
| | CAUSE INDICATOR | | | |
| | PRIVATE OPTIONAL | | | |
| ANSWER | ACCESS TRANSPORT | | | |
| | BACKWARD CALL INDICATOR | | | |
| | PRIVATE OPTIONAL | | | |
| CALL PROGRESS | NOTIFICATION | | | |
| | BACKWARD CALL INDICATOR | | | |
| | ACCESS TRANSPORT | | | |
| | CAUSE INDICATOR | | | |
| | BACKWARD CALL INDICATOR | | | |
| CIRCUIT VALIDATION RESPONSE MESSAGE | CIRCUIT ID NAME | | | |
| | CLLI CODE | | | |
| CONTINUITY | CONTINUITY INDICATOR | | | |
| EXIT | DISPOSITION | | | |
| | TRUNK GROUP NUMBER | | | |
| | SEND BACK EXIT MESSAGE | | | |
| INITIAL ADDRESS | FORWARD CALL INDICATOR | | | |
| | CALLING PARTY'S CATEGORY | | | |
| | GENERIC ADDRESS PARAMETER (LNP) | | | |
| | CALLED PARTY NUMBER | | | |
| | CALLING PARTY NUMBER | | | |
| | GENERIC DIGITS | | | |
| | CHARGE NUMBER | | | |
| | ORIGINATING LINE INFORMATION | | | |
| | TRANSIT NETWORK SELECTION | | | |
| | CARRIER SELECTION INFORMATION | | | |
| | ORIGINATING LINE INFORMATION | | | |
| | SERVICE CODE | | | |
| | CARRIER IDENTIFICATION | | | |
| | ORIGINAL CALLED NUMBER | | | |
| | REDIRECTING NUMBER | | | |
| | REDIRECTION INFORMATION | | | |
| | GENERIC ADDRESS (NON-LNP) | | | |
| | ACCESS TRANSPORT | | | |
| | HOP COUNTER | | | |
| | JURISDICTION INFORMATION | | | |
| RELEASE | ACCESS TRANSPORT | | | |
| | AUTOMATIC CONGESTION CONTROL | | | |

FIG. 42

SYSTEM AND METHOD FOR PROCESSING CALL SIGNALING

RELATED APPLICATIONS

Not Applicable

FEDERALLY SPONSORED RESEARCH OR DEVELOPMENT

Not Applicable

MICROFICHE APPENDIX

Not Applicable

FIELD OF THE INVENTION

The present invention relates to the field of telecommunications call switching and transport and, more particularly, for receiving, processing, and/or transmitting call signaling.

BACKGROUND OF THE INVENTION

Broadband systems provide telecommunications providers with many benefits, including greater bandwidth, more efficient use of bandwidth, and the ability to integrate voice, data, and video communications. These broadband systems provide callers with increased capabilities at lower costs. The broadband systems use call signaling to determine call routing and processing.

Currently, many broadband systems use similar call signaling communication methods regardless of whether signaling is transferred to or from specific telecommunications networks from other networks, within specific networks, or between specific networks. For example, typically all call signaling is transmitted via links in a signaling system 7 (SS7) network. However, increased efficiency and speed may be realized by using different methods and systems for transferring call signaling within and between designated communications networks. Thus, a system is needed for intra-network and inter-network call signaling transmissions that will increase the speed and efficiency of transmitting and processing call signaling.

SUMMARY OF THE INVENTION

The present invention comprises a system for connecting a call having call signaling. The system comprises a signaling processor to receive and process the call signaling to determine new call signaling and a connection for the call. The system also has a signaling point connected to the signaling processor by at least either a backplane or a bus structure or a single computer architecture. The signaling point is to receive and transmit the call signaling and the new call signaling between the signaling processor and a communication device.

The present invention also comprises a system for connecting a call having call signaling and user communications. The system comprises a signaling processor to receive and process the call signaling to determine a connection for the user communications, to determine a destination for processed call signaling, and to transmit the processed call signaling. A signaling point is connected to the signaling processor in a single architecture. The signaling point is to receive and transmit the call signaling between the signaling processor and a communication device. An asynchronous transfer mode matrix is to receive the processed call signaling from the signaling processor and to connect the processed call signaling using an asynchronous transfer mode connection.

The present invention further comprises a system for connecting a call having call signaling and user communications. The system comprises a signaling processor to receive and process the call signaling to determine a connection for the user communications, to determine a destination for processed call signaling, and to transmit the processed call signaling. An asynchronous transfer mode matrix receives the processed call signaling from the signaling processor and connects the processed call signaling using an asynchronous transfer mode connection.

Further, the present invention comprises a system for connecting a call having call signaling and user communications. The system comprises a signaling interface adapted to receive and process the call signaling to determine call information elements and to transmit the call information elements. A call processor is adapted to receive and process the call information elements to determine a connection for the user communications, to determine a destination for new call signaling, and to generate the new call signaling. An asynchronous transfer mode matrix is adapted to receive the new call signaling from the call processor and to transmit the new call signaling using an asynchronous transfer mode connection.

The present invention also is directed to a system for connecting a call having call signaling and user communications. The system comprises a signaling interface that receives and process the call signaling to determine call information elements, transmits the call information elements, receives new call information elements, and transmits the new call information elements as new call signaling. A call processor receives the call information elements from the signaling interface, processes the call information elements to determine new call information elements, determines a destination for new call signaling, and generates new call information elements to the signaling interface. An asynchronous transfer mode matrix receives the new call signaling from the signaling interface and transmits the new call signaling using an asynchronous transfer mode connection.

Also, the present invention is directed to a system for connecting a call having call signaling and user communications. The system comprises an asynchronous transfer mode matrix adapted to receive the call signaling over an asynchronous transfer mode connection and to transmit the call signaling. A call processor is adapted to receive the call signaling from the asynchronous transfer mode matrix, to process the call signaling to determine new call signaling and a destination for new call signaling, and to generate new call signaling. A, signaling interface is adapted to receive the new call signaling from the call processor, to process the new call information elements to determine new call signaling, and to transmit the new call signaling.

Still further, the present invention is directed to a system for connecting a call having call signaling and user communications. The system comprises an asynchronous transfer mode matrix that is adapted to receive the call signaling over an asynchronous transfer mode connection and to transmit the call signaling. A signaling interface is adapted to receive the call signaling from the asynchronous transfer mode matrix, to process the call signaling to determine call information elements, and to transmit the call information elements. A call processor is adapted to receive the call information elements from the signaling interface, to process the call information elements to determine new call signaling and a destination for new call signaling, and to generate new call signaling as new call information elements.

Further yet, the present invention is directed to a system for connecting a call having call signaling and user communications. The system comprises an asynchronous transfer mode matrix that is adapted to receive the call signaling over an asynchronous transfer mode connection and to transmit the call signaling. A call processor is adapted to receive the call signaling from the asynchronous transfer mode matrix, to process the call signaling to determine a destination for new call signaling, and to generate new call information elements for the new call signaling. A signaling interface is adapted to receive and process the new information elements to new call signaling and to transmit the new call signaling. A signaling point is connected to the signaling interface by at least one of a backplane, a bus structure, and a single computer and is adapted to receive the new call signaling from the signaling interface and to transmit the new call signaling to the destination.

The present invention also is directed to a system for connecting a call having call signaling and user communications. The system comprises a signaling interface that is adapted to receive and process the call signaling to determine call information elements and to transmit the call information elements. A signaling point is connected to the signaling interface in a single computer architecture and is adapted to receive the call signaling from a communication device and to transmit the call signaling to the signaling interface. A call processor is adapted to receive the call information elements from the signaling interface, to process the call information elements to determine new call information elements, to determine a destination for new call signaling, and to generate new call information elements. An asynchronous transfer mode matrix is adapted to receive the new call information elements from the call processor and to connect the new call information elements using an asynchronous transfer mode connection for the destination.

Moreover, the present invention is directed to a system for connecting a call having call signaling and user communications. The system comprises a call processor that is adapted to receive the call signaling and to process the call signaling to determine a destination for new call signaling, and to generate new call information elements for the new call signaling. The system further comprises a signaling interface that is adapted to receive the new information elements from the call processor, to process the new information elements to new call signaling, and to transmit the new call signaling. The system includes a signaling point that is connected to the signaling interface by at least one of a backplane, a bus structure, and a single computer and that is adapted to receive the new call signaling from the signaling interface and to transmit the new call signaling to the destination selected by the call processor.

In addition, the present invention is directed to a system for connecting a call having call signaling and user communications. The system comprises a signaling interface that is adapted to receive and process the call signaling to determine call information elements and to transmit the call information elements. A signaling point is connected to the signaling interface by at least one of a backplane, a bus structure, and a single computer and is adapted to receive the call signaling from a communication device and to transmit the call signaling to the signaling interface. A call processor is adapted to receive the call information elements from the signaling interface, to process the call information elements to determine new call information elements, to determine a destination for new call signaling, and to generate new call information elements for the new call signaling for the destination.

BRIEF DESCRIPTION OF THE DRAWINGS

FIG. 6 is a functional diagram of an asynchronous transfer mode interworking unit for use with a synchronous optical network system in accordance with the present invention.

FIG. 7 is a functional diagram of an asynchronous transfer mode interworking unit for use with a synchronous digital hierarchy system in accordance with the present invention.

FIG. 13 is a table diagram of a time division multiplex trunk circuit table used in the signaling processor of FIG. 8.

FIG. 14 is a table diagram of an asynchronous transfer mode trunk circuit table used in the signaling processor of FIG. 8.

FIG. 15A is a table diagram of a trunk group table used in the signaling processor of FIG. 8.

FIG. 15B is a continuation table diagram of the trunk group table of FIG. 15A.

FIG. 15C is a continuation table diagram of the trunk group table of FIG. 15B.

FIG. 16 is a table diagram of a carrier table used in the signaling processor of FIG. 8.

FIG. 17 is a table diagram of an exception table used in the signaling processor of FIG. 8.

FIG. 18 is a table diagram of an originating line information table used in the signaling processor of FIG. 8.

FIG. 19 is a table diagram of an automated number identification table used in the signaling processor of FIG. 8.

FIG. 20 is a table diagram of a called number screening table used in the signaling processor of FIG. 8.

FIG. 21 is a table diagram of a called number table used in the signaling processor of FIG. 8.

FIG. 22 is a table diagram of a day of year table used in the signaling processor of FIG. 8.

FIG. 23 is a table diagram of a day of week table used in the signaling processor of FIG. 8.

FIG. 24 is a table diagram of a time of day table used in the signaling processor of FIG. 8.

FIG. 25 is a table diagram of a time zone table used in the signaling processor of FIG. 8.

FIG. 26 is a table diagram of a routing table used in the signaling processor of FIG. 8.

FIG. 27 is a table diagram of a trunk group class of service table used in the signaling processor of FIG. 8.

FIG. 28 is a table diagram of a treatment table used in the signaling processor of FIG. 8.

FIG. 29 is a table diagram of an outgoing release table used in the signaling processor of FIG. 8.

FIG. 30 is a table diagram of a percent control table used in the signaling processor of FIG. 8.

FIG. 31 is a table diagram of a call rate table used in the signaling processor of FIG. 8.

FIG. 32 is a table diagram of a database services table used in the signaling processor of FIG. 8.

FIG. 33A is a table diagram of a signaling connection control part table used in the signaling processor of FIG. 8.

FIG. 33B is a continuation table diagram of the signaling connection control part table of FIG. 33A.

FIG. 33C is a continuation table diagram of the signaling connection control part table of FIG. 33B.

FIG. 33D is a continuation table diagram of the signaling connection control part table of FIG. 33C.

FIG. 34 is a table diagram of an intermediate signaling network identification table used in the signaling processor of FIG. 8.

FIG. 35 is a table diagram of a transaction capabilities application part table used in the signaling processor of FIG. 8.

FIG. 36 is a table diagram of a external echo canceller table used in the signaling processor of FIG. 8.

FIG. 37 is a table diagram of an interworking unit used in the signaling processor of FIG. 8.

FIG. 38 is a table diagram of a controllable asynchronous transfer mode matrix interface table used in the signaling processor of FIG. 8.

FIG. 39 is a table diagram of a controllable asynchronous transfer mode matrix table used in the signaling processor of FIG. 8.

FIG. 40A is a table diagram of a site office table used in the signaling processor of FIG. 8.

FIG. 40B is a continuation table diagram of the site office table of FIG. 40A.

FIG. 40C is a continuation table diagram of the site office table of FIG. 40B.

FIG. 40D is a continuation table diagram of the site office table of FIG. 40C.

FIG. 41A is a table diagram of an advanced intelligent network event parameters table used in the signaling processor of FIG. 8.

FIG. 41B is a continuation table diagram of the advanced intelligent network event parameters table of FIG. 41A.

FIG. 42 is a table diagram of a message mapping table used in the signaling processor of FIG. 8.

DETAILED DESCRIPTION

Figure 2:
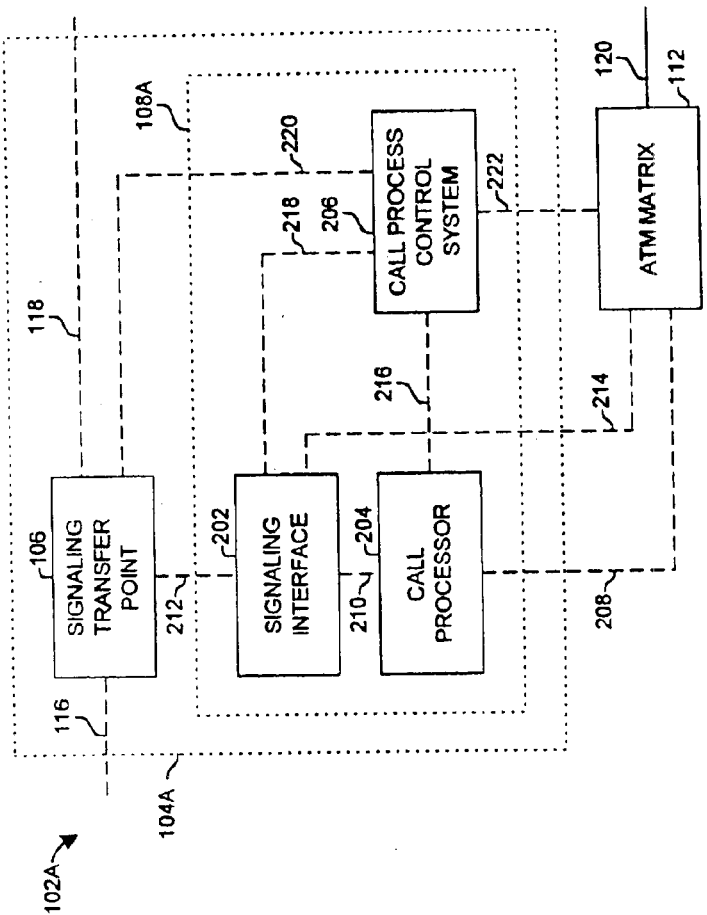
FIG. 2 is a block diagram of a signaling system in accordance with an embodiment of the present invention.

Telecommunication systems have a number of communication devices in local exchange and interexchange environments that interact to provide call services to customers. Both traditional and intelligent network (IN) services and resources are used to process, route, or connect a call to a designated connection.

Typically, these telecommunication systems have a series of signaling transfer points (STPs) to route call signaling through the telecommunication system over 56 kilo-bit (KB) access links. For example, a local exchange carrier (LEC) that is connecting a call through an interexchange carrier (IXC) will transfer call signaling to the LEC STP. The LEC STP then transfers the call signaling to the IXC STP.

The IXC may have multiple nodes. If a first IXC node is to receive the call connection, that IXC node processes the call signaling and transmits signaling back to the LEC via the IXC STP and the LEC STP. However, if a second IXC node is to receive the call connection, the IXC STP processes the call signaling and transfers the call signaling to another IXC STP for processing.

In the same manner, if one IXC node is connecting a call through another IXC node, the first IXC node must generate call signaling to the first IXC STP which is outside of the immediate DCC network. This signaling is transmitted to the second IXC STP which is outside the immediate second DCC node network. The call signaling then is transmitted to the second IXC node for processing. Since the STPs are outside of the immediate DCC networks, generation and transmission of the call signaling out of the IXC network to the STPs and back into the other IXC network is time consuming.

The present invention incorporates the STP functionality with the network call signaling generation and signaling processing components. This improves efficiency since call signaling can be transmitted directly to other network devices. The present system can transfer call signaling over asynchronous transfer mode (ATM) connections for increased bandwidth. The ATM connections can use synchronous optical network (SONET) or synchronous digital hierarchy (SDH) formatted connections. Also, the present system can use transmission standards that are more efficient and/or proprietary standards. The present system can be used in, with, and between private networks, LEC networks, IXC networks, and other communication networks for connecting calls by receiving, processing, and transmitting call signaling.

A call has user communications and call signaling. The user communications contain the caller's information, such as a voice communication or data communication, and they are transported over a connection. Call signaling contains information that facilitates call processing, and it is communicated over a link. Call signaling, for example, contains information describing the called number and the calling number. Examples of call signaling are standardized signaling, such as signaling system #7 (SS7), C7, integrated services digital network (ISDN), and digital private network signaling system (DPNSS), which are based on ITU recommendation Q.931. A call can be connected to and from communication devices.

Connections are used to transport user communications and other device information between communication devices and between the elements and devices of the system. The term "connection" as used herein means the transmission media used to carry user communications between elements of the various telecommunications networks and systems. For example, a connection could carry a user's voice, computer data, or other communication device data. A connection can be associated with either in-band communications or out-of-band communications.

Links are used to transport call signaling and control messages. The term "link" as used herein means a transmission media used to carry call signaling and control messages. For example, a link would carry call signaling or a device control message containing device instructions and data A link can carry, for example, out-of-band signaling such as that used in SS7, C7, ISDN, DPNSS, B-ISDN, GR-303, or could be via local area network (LAN), or data bus call signaling. A link can be, for example, an (ATM adaptation layer 5) AAL5 data link, UDP/IP, ethernet, DS0, or DS1. In addition, a link, as shown in the figures, can represent a single physical link or multiple links, such as one link or a combination of links of ISDN, SS7, TCP/IP, or some other data link. The term "control message" as used herein means a control or signaling message, a control or signaling instruction, or a control or signaling signal, whether proprietary or standardized, that conveys information from one point to another.

Figure 1:
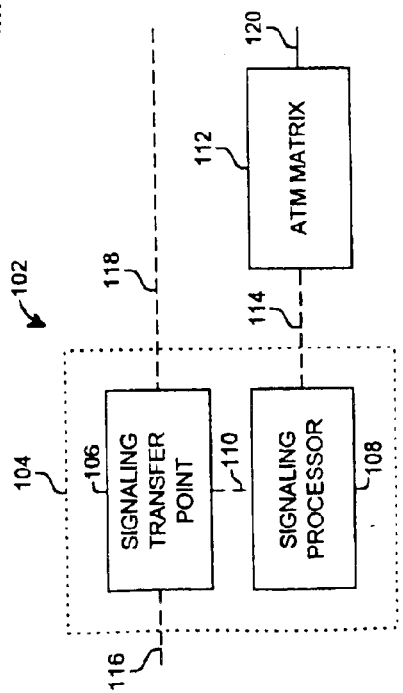
FIG. 1 is a block diagram of a signaling system in accordance with an embodiment of the present invention.

FIG. 1 illustrates an exemplary embodiment of the signaling system 102 of the present invention. The signaling system 102 comprises a signal processing system 104 that has a signaling point 106 and a signaling processor 108 linked by a link 10. The signaling system 102 also has a controllable ATM matrix 112 that is linked to the call processor through a link 114. Access links 116 and 118 link the signaling point 106 to communication devices (not shown). An ATM connection 120 carries signaling, and in other embodiments user communications, to and from the ATM matrix 112.

In general, the signal process system 104 receives call signaling, processes call signaling, generates call signaling, and transmits call signaling. After processing the call signaling, the signal process system 104 may connect calls to communication devices, such as a destination communication device or resources, or complete further call processing.

The signaling point 106 is the part of the signal process system 104 that receives the call signaling from other communication devices and transmits the call signaling to other communication devices based on the origination point code (OPC), the destination point code (DPC), and the circuit identification code (CIC). The signaling point 106 receives and transmits transaction capabilities application part (TCAP) messages that are received from, or transmitted to, communication devices outside of the signaling system 102.

Also, the signaling point 106 is a point code converter that has its own point codes from network to network. The signaling point 106 performs global title translations (GTT) by converting dialed numbers to a GTT number. The GTT number is a code that identifies destinations for communication devices. A GTT is an address such as for customer-dialed digits that does not explicitly contain information that would allow routing in the SS7 signaling network, that is, the signaling connection control part (SCCP) translation function is required.

The signaling processor 108 is a signaling platform that can receive, process, and generate call signaling. Based on the processed call signaling, the signaling processor 108 selects processing options, services, or resources for the user communications and generates and transmits control messages that identify the communication device, processing option, service, or resource that is to be used. The signaling processor 108 also selects virtual connections and circuit-based connections for call routing and generates and transports control messages that identify the selected connections. The signaling processor 108 can process various forms of signaling, including ISDN, GR-303, B-ISDN, SS7, and C7. A preferred signaling processor is discussed below.

The ATM matrix 112 is a controllable ATM matrix that establishes connections in response to control messages received from the signaling processor 108. The ATM matrix 112 is able to interwork between ATM connections and time division multiplex (TDM) connections. The ATM matrix 112 also cross connects ATM connections with other ATM connections. In addition, the ATM matrix 112 can switch calls from TDM connections to other TDM connections. The ATM matrix 112 transmits and receives call signaling and user communications over the connections. Typically, the ATM matrix 112 transmits call signaling that is received from the signaling processor 108.

The call signaling can be converted to any required form so that it can be transmitted or received either over the access links 116 and 118 or over the connection 120. In a first preferred method, call signaling is converted between SS7 and broadband integrated services user part (BISUP) for constant bit rate (CBR). In a second preferred method, call signaling is converted between SS7 and Private Network-Network Interface (PNNI) for CBR.

The selection by the signaling processor 108 of the connections over which the call signaling is transported can occur by any required method. For example, the selection can be made based on traffic management techniques using congestion control, availability, or sequential order. A preferred standard technique for call signaling transmissions over ATM is based on the ATM Forum Standard for VP0/VC15 the disclosure of which is fully incorporated by reference herein.

Because the call signaling can be communicated between the signaling processor 108 and the ATM matrix 112, and subsequently to other networks through ATM connections, the signaling system 102 can use any standard or proprietary format. Moreover, call signaling can be transmitted between networks without having to go through STPs. The call signaling can be transferred from a first signaling processor, through a first ATM matrix to a second ATM matrix, and then to a second signaling processor. Thus, the present system has a greater speed and efficiency than prior systems. Moreover, this provides system independence, allowing signaling systems to be set up and interconnected in a manner to have an overlay signaling network.

An example of the operation of the signaling system 102 of FIG. 1 is as follows. The signaling point 106 receives call signaling over the access link 116 from a communication device (not shown), such as a LEC switch. The signaling point 106 determines that the signaling processor 108 is to receive the call signaling and transfers the call signaling thereto.

The signaling processor 108 processes the call signaling and determines that the call signaling is to be routed to a communication device that is within a communication network. Such a communication network may be similar to the signaling system 102 and have a signaling processor similar to the signaling processor 108.

The signaling processor 108 selects a connection, such as the connection 120, over which the call signaling will be transmitted. In this example, the connection 120 is an ATM virtual path/virtual connection (VP/VC). The signaling processor 108 transmits to the ATM matrix 112 the call signaling and a control message identifying the selected connection 120.

The ATM matrix 112 receives the call signaling and the control message. The ATM matrix 112 transmits the call signaling on the designated connection 120.

In a first embodiment, the call signaling is sent in the ATM format from the signaling processor 108 to the ATM matrix 112 so that the ATM matrix cross connects the call signaling from the link 114 to the designated connection 120. In another embodiment, the ATM matrix 112 receives the call signaling from the signaling processor 108 in a format that requires conversion to the ATM format. In such a case, the ATM matrix 112 converts the call signaling to the ATM format prior to transmitting it on the designated connection 120. Preferably, the signaling processor 108 places the call signaling in the ATM format for AAL5.

Still referring to FIG. 1, in another example, call signaling is received at the ATM matrix 112. The ATM matrix 112 transmits the call signaling to the signaling processor 108 for processing. The signaling processor 108 processes the call signaling and determines that the call signaling is to be transmitted to a communication device (not shown), such as a LEC, through an access link, such as access link 118.

The signaling processor 108 transmits the call signaling to the signaling point 106. The signaling point 106 identifies the information in the call signaling that allows the STP to route the call signaling to the communication device and routes the call signaling accordingly.

Either the signaling processor 108 or the signaling point 106 can place the call signaling in the appropriate format before the call signaling is transmitted from the signaling point 106. For example, if the signaling system 102 is in an SS7 communication network, the call signaling must be placed in the SS7 format before being transmitted from the signaling point 106. Preferably, the signaling processor 108 places the call signaling in the required format, such as the SS7 format, before the call signaling is transmitted to the STP 108.

In another example, call signaling is received at the ATM matrix 112. The ATM matrix 112 transmits the call signaling to the signaling processor 108 for processing. The signaling processor 108 processes the call signaling and determines that the call signaling is to be transmitted to a communication device (not shown) over an ATM connection.

The signaling processor 108 selects a connection, such as the connection 120, over which the call signaling will be transmitted. In this example, the connection 120 is an ATM VP/VC. The signaling processor 108 transmits to the ATM matrix 112 the call signaling and a control message identifying the selected connection 120. The ATM matrix 112 receives the call signaling and the control message and transmits the call signaling on the designated connection 120.

In another example, the signaling point 106 receives call signaling and determines that the call signaling is not to be transferred to the signaling processor 108. Rather the call signaling is to be routed to another communication device (not shown), such as a LEC. In that case, the signaling point 106 routes the call signaling accordingly.

Those skilled in the art are aware that large networks have many more components than those that are shown in FIG. 1. For example, there typically may be a multitude of switches and communication devices connected through the signaling point 106 or through the ATM matrix 112. The number of components shown on FIG. 1 has been restricted for clarity. The invention is fully applicable to a large network or a small network.

FIG. 2 illustrates an exemplary embodiment of a signaling processor 108A for use in a signaling system 102A with the signaling point 106 and the ATM matrix 112. The signaling processor 108A comprises a signaling interface 202, a call processor 204, and a call process control system (CPCS) 206.

The call processor 204 is linked to the ATM matrix 112 through a link 208 over which control messages and call signaling are passed and to the signaling interface 202 by a link 210 over which call signaling is passed. The signaling interface 202 is linked to the signaling point 106 by a link 212 over which call signaling is passed and to the ATM matrix 112 by a link 214 over which call signaling is passed. The CPCS 206 has links 216, 218, 220, and 222 to the call processor 204, the signaling interface 202, the signaling point 106, and the ATM matrix 112, respectively, over which administrative information and control messages are passed.

The signaling interface 202 receives, processes, and transmits call signaling. The signaling interface 202 can obtain information from, and transmit information to, a communication device via the STP 202 or the ATM matrix 112. Such information may be transferred, for example, as a TCAP message in queries or responses, for example through the signaling point 106, or as other SS7 messages, for example through the ATM matrix 112. The signaling interface 202 also passes information to the call processor 204 for processing and passes information from the call processor to other communication devices (not shown).

The call processor 204 is a signaling platform that can receive and process call signaling. The call processor 204 has data tables which have call connection data and which are used to process the call signaling. Based on the processed call signaling, the call processor 204 determines destinations for outgoing call signaling and selects processing options, services, or resources for the user communications. The call processor 204 generates and transmits control messages that identify the communication device, processing option, service, or resource that is to receive call signaling or that is be used for call connections or further call processing. The call processor 204 also selects virtual connections and circuit-based connections for routing of call signaling and connections for user communications and generates and transports control messages that identify the selected connections.

The CPCS 206 is a management and administration system. The CPCS 206 is the user interface and external systems interface into the call processor 204. The CPCS 206 serves as a collection point for call-associated data such as translations having call routing data, logs, operational measurement data, alarms, statistical information, accounting information, and other call data. The CPCS 206 accepts data, such as the translations, from operations systems and updates the data in the tables in the call processor 204. The CPCS 206 also provides configuration data to the elements of the signaling system 102A including to the signaling point 106, the ATM matrix 112, the signaling interface 202, the call processor 204, and any interworking units (not shown). In addition, the CPCS 206 provides for remote control of call monitoring and call tapping applications from the call processor 204. The CPCS 206 may be a local CPCS that services only components of a local signaling system or a regional CPCS that services components of multiple signaling systems. It will be appreciated that a signaling system without a CPCS, but with a signaling interface and a call processor, will operate satisfactorily for the purposes of this invention.

Any combination of one or more of the components of the signaling point 106, the signaling interface 202, and the call processor 204 may be in a single computer architecture, such as with the same backplane or bus structure or located in the same computer. This allows communications between the components to occur at a faster rate and in a more efficient manner. The components may be configured to transfer information, messages, or communications with and between the other components in any format, standard, or method. For example, the signaling point 106 and the signaling interface 202 can communicate call signaling between them without the information in the call signaling being placed in a TCAP message or other standard SS7 message. Thus, the transfer of information can occur at a higher rate between the components, and any of the components can place the information in a form that is standard to elements that are not in the signaling system 102A. For example, the signaling point 106 can format information in a TCAP or other SS7 message when required.

However, it will be appreciated that one or more of the components of the signaling point 106, the signaling interface 202, and the call processor 204 also may be in a different computer architectures. In addition, for example, communications may occur between the components in standard formats. For example, the signaling point 106 and the signaling interface 202 can communicate call signaling between them with the information in the call signaling being placed in a TCAP message or other standard SS7 message.

The operation of the signaling system 102A of FIG. 2 will be described below with reference to a call connection with user communications. This will provide a more complete description of the operation of the signaling system 102A when used with user communication connection devices. It will be appreciated that the whole of the call connection system with the call signaling system components and user communication devices, i.e. the interworking unit, for a total call connection is an aspect of the present invention.

Figure 3:
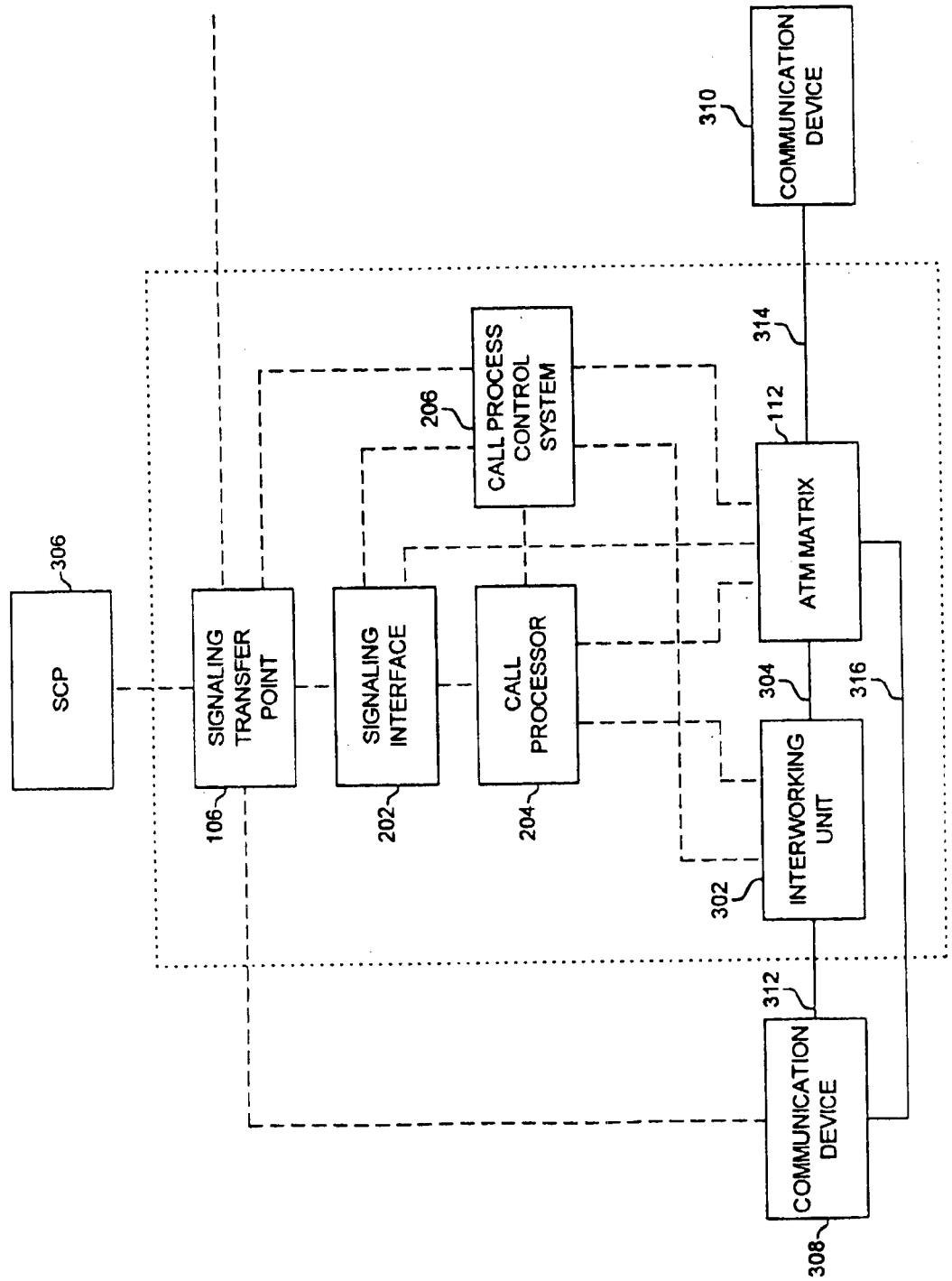
FIG. 3 is a block diagram of a call processing and signaling system in accordance with an embodiment of the present invention.

FIG. 3 illustrates a signaling system 102B for call connection. In addition to the devices of FIG. 2, the system of FIG. 3 comprises an interworking unit 302 connected to the ATM matrix 112 by a connection 304 and linked to the call processor 204 and the CPCS 206. A service control point (SCP) 306 is linked to the signaling point 106. A first communication device 308 and a second communication device 310 are connected to the system through connections 312 and 314, respectively, and links. An optional ATM connection 316 may exist between the ATM matrix 112 and the first communication device 308. For clarity, the links and the other connections in FIG. 3 are not identified with reference numerals.

The interworking unit 302 interworks traffic between various protocols. Preferably, the interworking unit 302 interworks between ATM traffic and non-ATM traffic. The interworking unit 302 operates in accordance with control messages received from the call processor 204. These control messages typically are provided on a call-by-call basis and typically identify an assignment between a DS0 and a VP/VC for which user communications are interworked. In some instances, the interworking unit 302 may transport control messages which may include data to the call processor 204.

The SCP 306 contains information about the system and how to route calls through the system. The SCP 306 is queried from other communications devices, such as the call processor 204 via the signaling interface 202 and the STP 106 to determine how to route calls with advanced routing features such as N00 or routing menu.

The communication devices 308 and 310 comprise customer premises equipment (CPE), a service platform, a switch, a remote digital terminal, a cross connect, an interworking unit, an ATM gateway, or any other device capable of initiating, handling, or terminating a call. CPE can be, for example, a telephone, a computer, a facsimile machine, or a private branch exchange. A service platform can be, for example, any enhanced computer platform that is capable of processing calls. A remote digital terminal is a device that concentrates analog twisted pairs from telephones and other like devices and converts the analog signals to a digital format known as GR-303. An ATM gateway is a device that changes ATM cell header VP/VC identifiers. The communication devices 308 and 310 may be TDM based or ATM based. In the system of FIG. 3, preferably the first communication device 308 is TDM based, and the second communication device 310 is ATM based.

In operation, the signaling system 102B can transfer signaling using several different methods. In a first preferable method, the call processor 204 transmits call signaling message parameters to the ATM matrix 112 or to the signaling interface 202, depending on whether the call signaling is being transmitted via an ATM network or via the signaling point 106 to an SS7 network. In a second preferable method, the call processor 204 transmits all message parameters to the signaling interface 202 regardless of whether the call signaling is being transmitted via an ATM network or via the signaling point 106 to an SS7 network.

In the first method, when the call processor 204 determines that the call signaling is to be transmitted from the ATM matrix 112, the call signaling message parameters are transmitted directly to the ATM matrix from the call processor. This has the benefit of increased speed and time savings since the message parameters need not be transmitted to the signaling interface 202 and need not be formatted as message signal units (MSUs). Either the call processor 204 or the ATM matrix 112 can place the message parameters in the ATM format. Preferably, the call processor 204 places the message parameters in the AAL5 ATM format. With this configuration, a link is not required between the signaling interface 202 and the ATM matrix 112.

Preferably, the ATM matrix 112 connects all call signaling received from the call processor 204 to a particular VP/VC, such as VP0/VC15. Alternately, the call processor 204 can transmit a control message to the ATM matrix 112 identifying the VP/VC on which the call signaling is to be transported.

For this method, the signaling system 102B can be configured so that the call signaling that is received at the ATM matrix 112 is on a particular VP/VC, such as VP0/VC15. In such a case, all traffic that is received on the specific VP/VC is transmitted to the call processor 204.

When the call processor 204 determines that call signaling is to be transmitted from the signaling point 106, the call processor transmits the message parameters for the call signaling to the signaling interface 202. The signaling interface 202 assembles the call signaling and transmits it to the signaling point 106. The signaling point 106 reads the information in the call signaling and transmits the call signaling to the required communication device.

In a second method, all message parameters are transmitted to the signaling interface 202. The signaling interface 202 performs a table lookup operation on the information in the call signaling. For example, the signaling interface 202 can review the OPC, DPC, and CIC. Based on these, or other, factors, the signaling interface 202 can determine whether the call signaling is to be transmitted from the signaling point 106 or from the ATM matrix 112 and routes the call signaling accordingly. The signaling interface 202 can be configured to perform the table lookup either before or after assembling the call signaling into an MSU. If the call signaling is to be transmitted to the ATM matrix 112, either the signaling interface 202 or the ATM matrix can place the call signaling in the ATM format. It is preferred that the signaling interface 202 places the call signaling in the ATM format.

For this method, the signaling system 102B can be configured so that all call signaling that is received at the ATM matrix 112 is on a specific VP/VC, such as VP0/VC15. In such a case, all traffic that is received on the specific VP/VC is transmitted to the signaling interface 202.

In a third method, all message parameters are transmitted to the signaling interface 202. The signaling interface 202 then assembles the call signaling. However, the call processor 204 determines how the call signaling is to be transmitted and transmits a control message to the signaling interface 202 designating whether the call signaling is to be transmitted from the signaling point 106 or from the ATM matrix 112. The signaling interface then routes the call signaling accordingly. If the call signaling is to be transmitted to the ATM matrix 112, either the signaling interface 202 or the ATM matrix can place the call signaling in the ATM format. It is preferred that the signaling interface 202 places the call signaling in the ATM format.

For this method, the signaling system 102B can be configured so that all call signaling that is received at the ATM matrix 112 is on a specific VP/VC, such as VP0/VC15. In such a case, all traffic that is received on the specific VP/VC is transmitted to the signaling interface 202.

In an example of the operation of the signaling system 102B, the first communication device 308 transports user communications to the interworking unit 302 and transmits call signaling to the signaling point 106 over the access link. The signaling point 106 receives the call signaling, determines that the call processor 204 is to receive the call signaling, and transfers the call signaling to the signaling interface 202.

The signaling interface 202 processes the call signaling and converts it to call information elements, such as message parameters, that can be processed by the call processor 204. A call information element may be, for example, an integrated services user part initial address message (ISUP IAM) message parameter from an MSU or other message parameters. The signaling interface 202 passes the message parameters to the call processor 204.

The call processor 204 processes the call signaling message parameters and determines that the call is to be connected to the second communication device 310. In this example, the second communication device is an ATM device. The call processor 204 selects a connection, such as a VP/VC on the connection 314, over which the user communications will be transmitted between the ATM matrix 112 and the second communication device 310 and a connection, such as a VP/VC on the connection 304, over which the user communications will be transmitted between the interworking unit 302 and the ATM matrix. In this example, the signaling system 102B is configured so that all call signaling that is transmitted from the ATM matrix 112 is transported on VP0/VC15.

The call processor 204 transmits a control message to each of the interworking unit 302 and the ATM matrix 112 identifying the selected connections to connect the user communications. In addition, the call processor 204 transmits the call signaling message parameters in the ATM format to the ATM matrix 112. The message parameters may be new and/or modified parameters based on the connections and destinations required to connect the call.

The interworking unit 302 receives the user communications from the first communication device 308 and the control message from the call processor 202. In response to the control message, the interworking unit 302 interworks the user communications to the designated connection 304.

The ATM matrix 112 receives the user communications from the interworking unit 302 over the connection 304. Also, the ATM matrix 112 receives from the call processor 204 the message parameters and the control message which identifies the VP/VC on the connection 314. The ATM matrix 112 connects the user communications to the designated VP/VC and connects the call signaling message parameters to VP0/VC15. The call signaling message parameters and the user communications are received by the second communication device 310 over the designated VP/VC on the connection 314.

Still referring to FIG. 3, in another example, call signaling is received at the ATM matrix 112 over a designated VP/VC. The ATM matrix 112 transmits the call signaling to the signaling interface 202 for processing. The signaling interface 202 processes the call signaling and transmits the message parameters to the call processor 204.

The call processor 204 processes the call signaling message parameters and determines that the call is to be connected to the first communication device 310. In this example, the first communication device 308 is a TDM device. The call processor 204 selects a connection, such as a VP/VC on the connection 304, over which the user communications will be transmitted from the ATM matrix 112 and to the interworking unit 302 and a connection, such as a DS0 on the connection 312, over which the user communications will be transmitted between the interworking unit 302 and the first communication device 308.

The call processor 204 transmits a control message to each of the interworking unit 302 and the ATM matrix 112 identifying the selected connections. In addition, the call processor 204 transmits the call signaling message parameters to the signaling interface 202.

The signaling interface 202 performs a table lookup on the message parameters and determines that the call signaling is to be transmitted from the signaling point 106. The signaling interface 202 then assembles the call signaling and transmits the call signaling to the signaling point 106. The signaling point 106 identifies the information in the call signaling that allows the STP to route the call signaling to the first communication device 308 and routes the call signaling accordingly.

The ATM matrix 112 receives the control message from the call processor 204 and the user communications from the second communication device 310. In response to the control message, the ATM matrix 112 connects the user communications to the designated connection 304.

The interworking unit 302 receives the control message from the call processor 204 and the user communications from the ATM matrix 112. In response to the control message, the interworking unit 302 interworks the user communications with the designated connection 312.

In another example, call signaling is received at the ATM matrix 112 on a VP/VC that is designated for carrying call signaling. The ATM matrix 112 transmits the call signaling to the call processor 204 for processing. The call processor 204 processes the call signaling and determines that the call signaling is to be transmitted to the second communication device 310 over an ATM connection, such as a VP/VC that is designated for carrying call signaling. In addition, the call processor 204 determines a VP/VC over which the user communications are to be connected. In this example, the second communication device 310 may be an ATM cross connect.

The call processor 204 transmits the message parameters to the ATM matrix 112 and a control message that designates the VP/VC over which the user communications are to be connected. The ATM matrix 112 receives the message parameters and connects them to the designated VP/VC. Also, the ATM matrix 112 receives the control message and the user communications. In response to the control message, the ATM matrix 112 connects the user communications with the VP/VC identified in the control message.

In another example, call signaling is received at the ATM matrix 112 on a VP/VC that is designated for carrying call signaling. The ATM matrix 112 transmits the call signaling to the call processor 204 for processing. The call processor 204 processes the call signaling and determines that the call signaling is to be transmitted to the first communication device 308 over an ATM connection, such as VP0/VC15 on the connection 316. In addition, the call processor 204 determines a VP/VC on the connection 304 over which the user communications are to be connected between the ATM matrix 112 and the interworking unit 302 and a connection 312 over which the user communications are to be connected between the interworking unit and the first communication device 308.

The call processor 204 transmits the message parameters to the ATM matrix 112, a control message to the ATM matrix that designates the VP/VC over which the user communications are to be connected, and a control message to the interworking unit 302 identifying the connection 312 with which the user communications are to be interworked. The ATM matrix 112 receives the message parameters and connects them to the designated VP0/VC15 on the connection 316. Also, the ATM matrix 112 receives the control message and the user communications. In response to the control message, the ATM matrix 112 connects the user communications with the VP/VC on the connection 304 identified in the control message.

The first communication device 308 receives the user communication over the connection 312 and the call signaling over the VP/VC on the connection 316. In the present example, the first communication device 308 may be a LEC that receives TDM formatted user communications. Also, in the present example, the first communication device 308 may be a LEC that has an ATM card such that it can accept call signaling in an ATM format and convert the call signaling to any required format, such as SS7.

In another example, the signaling point 106 receives call signaling and determines that the call signaling is not to be transferred to the call processor 204 via the signaling interface 202. Rather the call signaling is to be routed to another communication device (not shown), such as a LEC. In that case, the signaling point 106 routes the call signaling accordingly.

In any of the above examples, the call processor 204 may determine that more information regarding the call is required. Thus, the call processor 204 may perform a dip to the SCP 306. In such a case, a TCAP query is initiated from the call processor 204 to the signaling interface 202 and transmitted to the signaling point 106. The signaling point 106 transmits the query to the SCP 306. The response then is transmitted from the SCP 304 to the signaling point 106. The signaling point 106 passes the call signaling to the signaling interface 202 which transmits the call signaling message parameters to the call processor 204.

It will be appreciated that any of the methods and components described in the above examples and systems may be combined in different ways to meet requirements of specific systems. Thus, for example, user communications and call signaling may be connected and/or transmitted in directions opposite of those described above for call connections that occur in directions opposite of those described above. Also by way of example only, call signaling can be connected on a VP/VC on the connection 316 which is selected by the call processor 204 and for which the call processor directs a control message to the ATM matrix 112. Also by way of example only, all call signaling for a particular system can be directed to the call processor 204 whether it is to be transmitted to an ATM network or to an SS7 network so that the call signaling transmitted to or from the ATM network does not get processed in the signaling interface 202 directly before or directly after being transmitted to or from, respectively, the ATM matrix 112. Alternately, by way of example only, in a particular system all call signaling can ultimately be processed in the signaling interface 202 whether it is transmitted to or from an ATM network or to or from an SS7 network. Other combinations may occur.

The Controllable ATM Matrix

Figure 4:
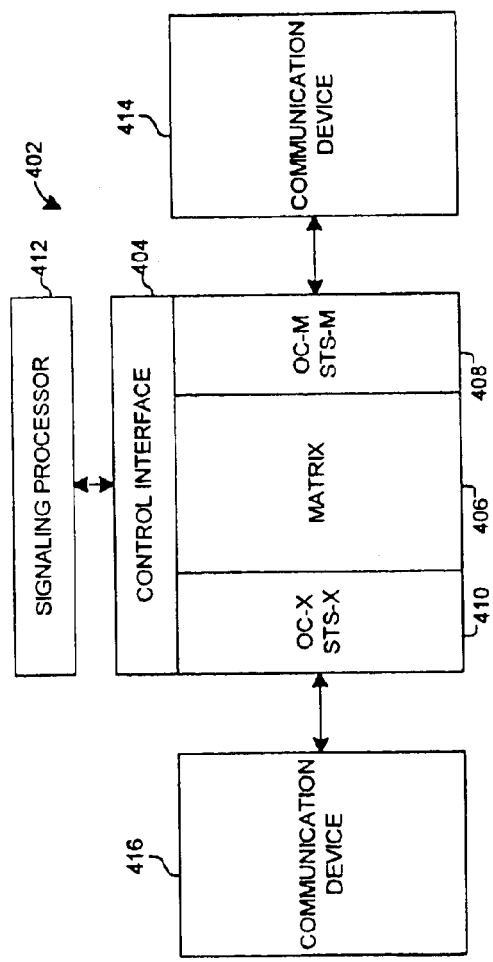
FIG. 4 is a functional diagram of a controllable asynchronous transfer mode matrix in accordance with the present invention.

FIG. 4 illustrates an exemplary embodiment of a controllable asynchronous transfer mode (ATM) matrix (CAM), but other CAMs that support the requirements of the invention also are applicable. The CAM 402 may receive and transmit ATM formatted user communications or call signaling.

The CAM 402 preferably has a control interface 404, a controllable ATM matrix 406, an optical carrier-M/synchronous transport signal-M (OC-M/STS-M) interface 408, and an OC-X/STS-X interface 410. As used herein in conjunction with OC or STS, "M" refers to an integer, and "X" refers to an integer.

The control interface 404 receives control messages originating from the signaling processor 412, identifies virtual connection assignments in the control messages, and provides these assignments to the matrix 406 for implementation. The control messages may be received over an ATM virtual connection and through either the OC-M/STS-M interface 408 or the OC-X/STS-X interface 410 through the matrix 406 to the control interface 404, through either the OC-M/STS-M interface or the OC-X/STS-X interface directly to the control interface, or through the control interface from a link.

The matrix 406 is a controllable ATM matrix that provides cross connect functionality in response to control messages from the signaling processor 412. The matrix 406 has access to virtual path/virtual channels (VP/VCs) over which it can connect calls. For example, a call can come in over a VP/VC through the OC-M/STS-M interface 408 and be connected through the matrix 406 over a VP/VC through the OC-X/STS-X interface 410 in response to a control message received by the signaling processor 412 through the control interface 404. Alternately, a call can be connected in the opposite direction. In addition, the a call can be received over a VP/VC through the OC-M/STS-M interface 408 or the OC-X/STS-X interface 410 and be connected through the matrix 406 to a different VP/VC on the same OC-M/STS-M interface or the same OC-X/STS-X interface.

The OC-M/STS-M interface 408 is operational to receive ATM cells from the matrix 406 and to transmit the ATM cells over a connection to the communication device 414. The OC-M/STS-M interface 408 also may receive ATM cells in the OC or STS format and transmit them to the matrix 406.

The OC-X/STS-X interface 410 is operational to receive ATM cells from the matrix 406 and to transmit the ATM cells over a connection to the communication device 416.

The OC-X/STS-X interface 410 also may receive ATM cells in the OC or STS format and transmit them to the matrix 406.

Call signaling may be received through and transferred from the OC-M/STS-M interface 408. Also, call signaling may be received through and transferred from the OC-X/STS-X interface 410. The call signaling may be connected on a connection or transmitted to the control interface directly or via the matrix 406.

The signaling processor 412 is configured to send control messages to the CAM 402 to implement particular features on particular VP/VC circuits. Alternatively, lookup tables may be used to implement particular features for particular VP/VCs.

Figure 5:
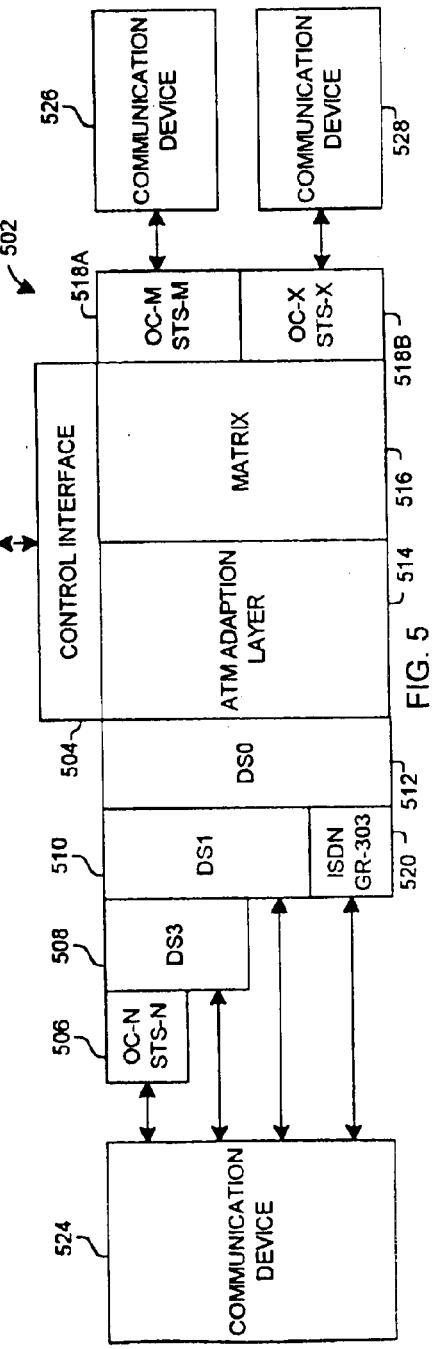
FIG. 5 is a functional diagram of a controllable asynchronous transfer mode matrix with time division multiplex capability in accordance with the present invention.

FIG. 5 illustrates another exemplary embodiment of a CAM which has time division multiplex (TDM) capability, but other CAMs that support the requirements of the invention also are applicable. The CAM 502 may receive and transmit in-band and out-of-band signaled calls.

The CAM 502 preferably has a control interface 504, an OC-N/STS-N Id interface 506, a digital signal level 3 (DS3) interface 508, a DS1 interface 510, a DS0 interface 512, an ATM adaptation layer (AAL) 514, a controllable ATM matrix 516, an OC-M/STS-M interface 518A, an OC-X/STS-X interface 518B, and an ISDN/GR-303 interface 520. As used herein in conjunction with OC or STS, "N" refers to an integer, "M" refers to an integer, and "X" refers to an integer.

The control interface 504 receives control messages originating from the signaling processor 522, identifies DS0 and virtual connection assignments in the control messages, and provides these assignments to the AAL 514 or the matrix 516 for implementation. The control messages may be received over an ATM virtual connection and through the OC-M/STS-M interface 518A to the control interface 504, through the OC-X/STS-X interface 518B and the matrix 516 to the control interface, or directly through the control interface from a link.

The OC-N/STS-N interface 506, the DS3 interface 508, the DS1 interface 510, the DS0 interface 512, and the ISDN/GR-303 interface 520 each can receive user communications from a communication device 524. Likewise, the OC-M/STS-M interface 518A and the OC-X/STS-X interface 518B can receive user communications from the communication devices 526 and 528.

The OC-N/STS-N interface 506 receives OC-N formatted user communications and STS-N formatted user communications and converts the user communications to the DS3 format. The DS3 interface 508 receives user communications in the DS3 format and converts the user communications to the DS1 format. The DS3 interface 508 can receive DS3s from the OC-N/STS-N interface 506 or from an external connection. The DS1 interface 510 receives the user communications in the DS1 format and converts the user communications to the DS0 format. The DS1 interface 510 receives DS1s from the DS3 interface 508 or from an external connection. The DS0 interface 512 receives user communications in the DS0 format and provides an interface to the AAL 514. The ISDN/GR-303 interface 520 receives user communications in either the ISDN format or the GR-303 format and converts the user communications to the DS0 format. In addition, each interface may transmit user communications in like manner to the communication device 524.

The OC-MISTS-M interface 518A is operational to receive ATM cells from the AAL 514 or from the matrix 516 and to transmit the ATM cells over a connection to the communication device 526. The OC-M/STS-M interface 518A also may receive ATM cells in the OC or STS format and transmit them to the AAL 514 or to the matrix 516.

The OC-X/STS-X interface 518B is operational to receive ATM cells from the AAL 514 or from the matrix 516 and to transmit the ATM cells over a connection to the communication device 528. The OC-X/STS-X interface 518B also may receive ATM cells in the OC or STS format and transmit them to the AAL 514 or to the matrix 516.

Call signaling may be received through and transferred from the OC-N/STS-N interface 506 and the ISDN/GR-303 interface 520. Also, call signaling may be received through and transferred from the OC-M/STS-M interface 518A and the OC-X/STS-X interface 518B. The call signaling may be connected on a connection or transmitted to the control interface directly or via an interface as explained above.

The AAL 514 comprises both a convergence sublayer and a segmentation and reassembly (SAR) sublayer. The AAL 514 obtains the identity of the DS0 and the ATM VP/VC from the control interface 504. The AAL 514 is operational to convert between the DS0 format and the ATM format. AALs are known in the art, and information about AALs is provided by International Telecommunications Union (ITU) documents in the series of I.363, which are incorporated herein by reference. For example, ITU document I.363.1 discusses AAL1. An AAL for voice calls is described in U.S. Pat. No. 5,806,553 entitled "Cell Processing for Voice Transmission," which is incorporated herein by reference.

Calls with multiple 64 Kilo-bits per second (Kbps) DS0s are known as Nx64 calls. If desired, the AAL 514 can be configured to accept control messages through the control interface 504 for Nx64 calls. The CAM 502 is able to interwork, multiplex, and demultiplex for multiple DS0s. A technique for processing VP/VCs is disclosed in U.S. patent application Ser. No. 08/653,852, which was filed on May 28, 1996, and entitled "Telecommunications System with a Connection Processing System," and which is incorporated herein by reference.

DS0 connections are bi-directional and ATM connections are typically uni-directional. As a result, two virtual connections in opposing directions typically will be required for each DS0. Those skilled in the art will appreciate how this can be accomplished in the context of the invention. For example, the cross-connect can be provisioned with a second set of VP/VCs in the opposite direction as the original set of VP/VCs.

The matrix 516 is a controllable ATM matrix that provides cross connect functionality in response to control messages from the signaling processor 522. The matrix 516 has access to VP/VCs over which it can connect calls. For example, a call can come in over a VP/VC through the OC-M/STS-M interface 518A and be connected through the matrix 516 over a VP/VC through the OC-X/STS-X interface 518B in response to a control message received by the signaling processor 522 through the control interface 504. Alternately, the matrix 516 may transmit a call received over a VP/VC through the OC-M/STS-M interface 518A to the AAL 514 in response to a control message received by the signaling processor 522 through the control interface 504. Communications also may occur in opposite directions through the various interfaces.

In some embodiments, it may be desirable to incorporate digital signal processing capabilities at, for example, the DS0 level. It also may be desired to apply echo control to selected DS0 circuits. In these embodiments, a signal processor may be included. The signaling processor 522 is configured to send control messages to the CAM 502 to implement particular features on particular DS0 or VP/VC circuits. Alternatively, lookup tables may be used to implement particular features for particular circuits or VP/VCs.

It will be appreciated from the teachings above for the CAMs and for the teachings below for the ATM interworking units, that the above described CAMs can be adapted for modification to transmit and receive other formatted communications such as synchronous transport module (STM) and European level (E) communications. For example, the OC/STS, DS3, DS1, DS0, and ISDN/GR-303 interfaces can be replaced by STM electrical/optical (E/O), E3, E1, E0, and digital private network signaling system (DPNSS) interfaces, respectively.

The ATM Interworking Unit

FIG. 6 illustrates an exemplary embodiment of an interworking unit which is an ATM interworking unit 602 suitable for the present invention for use with a SONET system. Other interworking units that support the requirements of the invention also are applicable. The ATM interworking unit 602 may receive and transmit in-band and out-of-band calls.

The ATM interworking unit 602 preferably has a control interface 604, an OC-N/STS-N interface 606, a DS3 interface 608, a DS1 interface 610, a DS0 interface 612, a signal processor 614, an AAL 616, an OC-M/STS-M interface 618, and an ISDN/GR-303 interface 620. As used herein in conjunction with OC or STS, "N" refers to an integer, and "M" refers to an integer.

The control interface 604 receives control messages originating from the signaling processor 622, identifies DS0 and virtual connection assignments in the control messages, and provides these assignments to the AAL 616 for implementation. The control messages are received over an ATM virtual connection and through the OC-M/STS-M interface 618 to the control interface 604 or directly through the control interface from a link.

The OC-N/STS-N interface 606, the DS3 interface 608, the DS1 interface 610, the DS0 interface 612, and the ISDN/GR-303 interface 620 each can receive user communications from a communication device 624. Likewise, the OC-M/STS-M interface 618 can receive user communications from a communication device 626.

The OC-N/STS-N interface 606 receives OC-N formatted user communications and STS-N formatted user communications and demultiplexes the user communications to the DS3 format. The DS3 interface 608 receives user communications in the DS3 format and demultiplexes the user communications to the DS1 format. The DS3 interface 608 can receive DS3s from the OC-N/STS-N interface 606 or from an external connection. The DS1 interface 610 receives the user communications in the DS1 format and demultiplexes the user communications to the DS0 format. The DS1 interface 610 receives DS1s from the DS3 interface 608 or from an external connection. The DS0 interface 612 receives user communications in the DS0 format and provides an interface to the AAL 616. The ISDN/GR-303 interface 620 receives user communications in either the ISDN format or the GR-303 format and converts the user communications to the DS0 format. In addition, each interface may transmit user communications in like manner to the communication device 624.

The OC-M/STS-M interface 618 is operational to receive ATM cells from the AAL 616 and to transmit the ATM cells over the connection to the communication device 626. The OC-M/STS-M interface 618 also may receive ATM cells in the OC or STS format and transmit them to the AAL 616.

Call signaling may be received through and transferred from the OC-N/STS-N interface 606 and the ISDN/GR-303 interface 620. Also, call signaling may be received through and transferred from the OC-M/STS-M interface 618. The call signaling may be connected on a connection or transmitted to the control interface directly or via another interface as explained above.

The AAL 616 comprises both a convergence sublayer and a segmentation and reassembly (SAR) sublayer. The AAL 616 obtains the identity of the DS0 and the ATM VP/VC from the control interface 604. The AAL 616 is operational to convert between the DS0 format and the ATM format.

If desired, the AAL 616 can be configured to accept control messages through the control interface 604 for Nx64 calls. The ATM interworking unit 602 is able to interwork, multiplex, and demultiplex for multiple DS0s.

DS0 connections are bi-directional and ATM connections are typically uni-directional. As a result, two virtual connections in opposing directions typically will be required for each DS0. Those skilled in the art will appreciate how this can be accomplished in the context of the invention. For example, the cross-connect can be provisioned with a second set of VP/VCs in the opposite direction as the original set of VP/VCs.

In some embodiments, it may be desirable to incorporate digital signal processing capabilities at the DS0 level. It may also be desired to apply echo control to selected DS0 circuits. In these embodiments, a signal processor 614 is included either separately (as shown) or as a part of the DS0 interface 612. The signaling processor 622 is configured to send control messages to the ATM interworking unit 602 to implement particular features on particular DS0 circuits. Alternatively, lookup tables may be used to implement particular features for particular circuits or VP/VCs.

FIG. 7 illustrates another exemplary embodiment of an interworking unit which is an ATM interworking unit 702 suitable for the present invention for use with an SDH system. The ATM interworking unit 702 preferably has a control interface 704, an STM-N electrical/optical (E/O) interface 706, an E3 interface 708, an E1 interface 710, an E0 interface 712, a signal processor 714, an AAL 716, an STM-M electrical/optical (E/O) interface 718, and a DPNSS interface 720. As used herein in conjunction with STM, "N" refers to an integer, and "M" refers to an integer.

The control interface 704 receives control messages from the signaling processor 722, identifies E0 and virtual connection assignments in the control messages, and provides these assignments to the AAL 716 for implementation. The control messages are received over an ATM virtual connection and through the STM-M interface 718 to the control interface 604 or directly through the control interface from a link.

The STM-N E/O interface 706, the E3 interface 708, the E1 interface 710, the E0 interface 712, and the DPNSS interface 720 each can receive user communications from a second communication device 724. Likewise, the STM-M E/O interface 718 can receive user communications from a third communication device 726.

The STM-N E/O interface 706 receives STM-N electrical or optical formatted user communications and converts the user communications from the STM-N electrical or STM-N optical format to the E3 format. The E3 interface 708 receives user communications in the E3 format and demultiplexes the user communications to the E1 format. The E3 interface 708 can receive E3s from the STM-N E/O interface 706 or from an external connection. The E1 interface 710 receives the user communications in the E1 format and demultiplexes the user communications to the E0 format. The E1 interface 710 receives E1s from the STM-N E/O interface 706 or the E3 interface 708 or from an external connection. The E0 interface 712 receives user communications in the E0 format and provides an interface to the AAL 716. The DPNSS interface 720 receives user communications in the DPNSS format and converts the user communications to the E0 format. In addition, each interface may transmit user communications in a like manner to the communication device 724.

The STM-M E/O interface 718 is operational to receive ATM cells from the AAL 716 and to transmit the ATM cells over the connection to the communication device 726. The STM-M E/O interface 718 may also receive ATM cells in the STM-M E/O format and transmit them to the AAL 716.

Call signaling may be received through and transferred from the STM-N E/O interface 706 and the DPNSS interface 720. Also, call signaling may be received through and transferred from the STM-M E/O interface 718. The call signaling may be connected on a connection or transmitted to the control interface directly or via another interface as explained above.

The AAL 716 comprises both a convergence sublayer and a segmentation and reassembly (SAR) sublayer. The AAL obtains the identity of the E0 and the ATM VP/VC from the control interface 704. The AAL 716 is operational to convert between the E0 format and the ATM format, either in response to a control instruction or without a control instruction. AAL's are known in the art. If desired, the AAL 716 can be configured to receive control messages through the control interface 704 for Nx64 user communications.

E0 connections are bi-directional and ATM connections typically are uni-directional. As a result, two virtual connections in opposing directions typically will be required for each E0. Those skilled in the art will appreciate how this can be accomplished in the context of the invention.

In some instances, it may be desirable to incorporate digital signal processing capabilities at the E0 level. Also, it may be desirable to apply echo control. In these embodiments, a signal processor 714 is included either separately (as shown) or as a part of the E0 interface 712. The signaling processor 722 is configured to send control messages to the ATM interworking unit 702 to implement particular features on particular circuits. Alternatively, lookup tables may be used to implement particular features for particular circuits or VP/VCs.

The Signaling Processor

The signaling processor receives and processes telecommunications call signaling, control messages, and customer data to select connections that establish communication paths for calls. In the preferred embodiment, the signaling processor processes SS7 signaling to select connections for a call. An example of call processing in a call processor and the associated maintenance that is performed for call processing is described in a U.S. patent application Ser. No. 09/026,766 entitled "System and Method for Treating a Call for Call Processing," which is incorporated herein by reference.

In addition to selecting connections, the signaling processor performs many other functions in the context of call processing. It not only can control routing and select the actual connections, but it also can validate callers, control echo cancellers, generate accounting information, invoke intelligent network functions, access remote databases, manage traffic, and balance network loads. One skilled in the art will appreciate how the signaling processor described below can be adapted to operate in the above embodiments.

Figure 8:
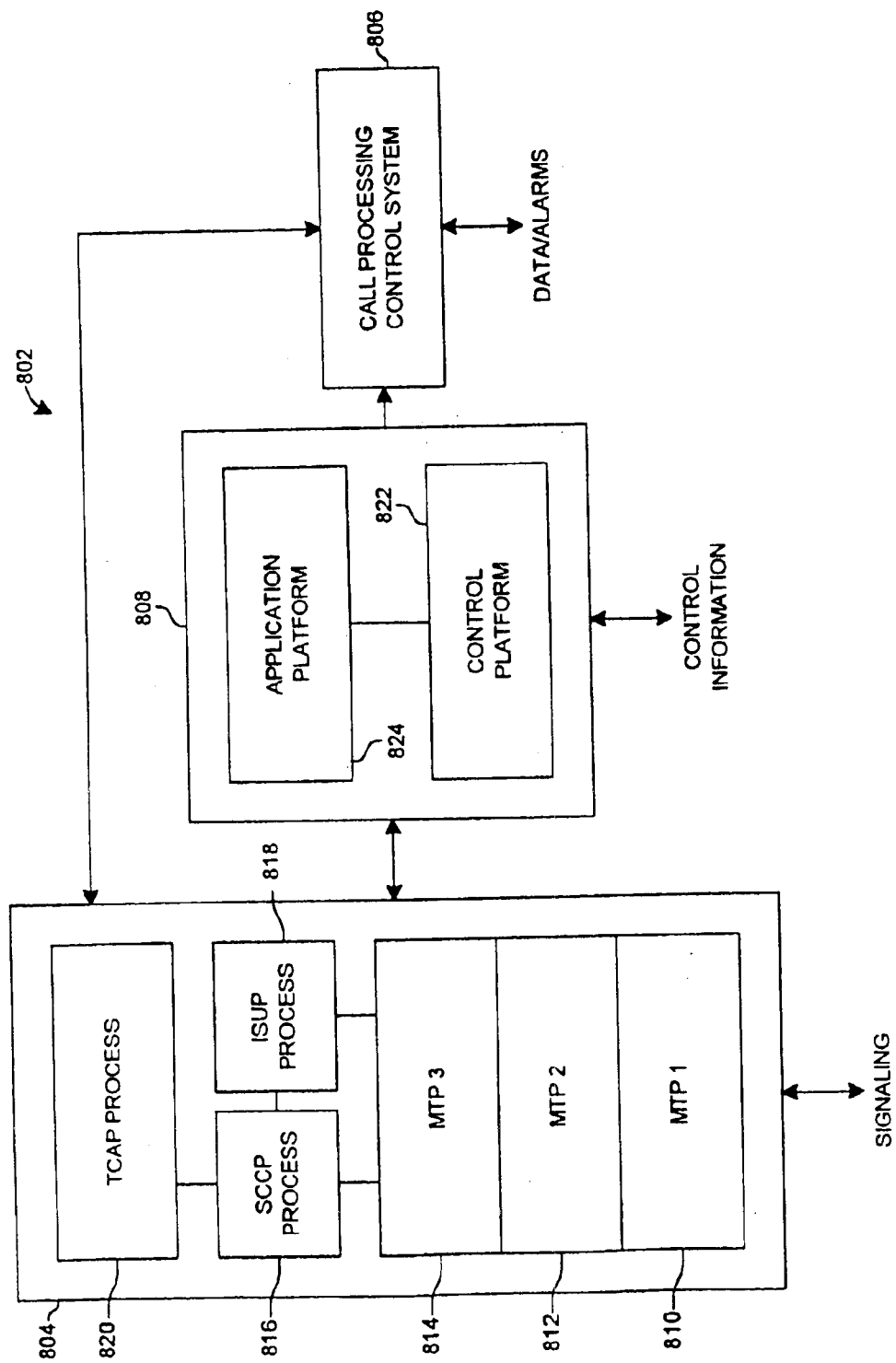
FIG. 8 is a block diagram of a signaling processor constructed in accordance with the present system.

FIG. 8 depicts an embodiment of a signaling processor. Other versions also are contemplated. In the embodiment of FIG. 8, the signaling processor 802 has a signaling interface 804, a call processing control system 806 (CPCS), and a call processor 808. It will be appreciated that the signaling processor 802 may be constructed as modules in a single unit or as multiple units.

The signaling interface 804 is coupled externally to signaling systems preferably to signaling systems having a message transfer part (MTP), an ISDN user part (ISUP), a signaling connection control part (SCCP), an intelligent network application part (INAP), and a transaction capabilities application part (TCAP). The signaling interface 804 preferably is a platform that comprises an MTP level 1 810, an MTP level 2 812, an MTP level 3 814, an SCCP process 816, an ISUP process 818, and a TCAP process 820. The signaling interface 804 also has INAP functionality.

The signaling interface 804 may be linked to a communication device (not shown). For example, the communication device may be an SCP which is queried by the signaling interface with a TCAP query to obtain additional call-associated data. The answer message may have additional information parameters that are required to complete call processing. The communication device also may be an STP or other device.

The signaling interface 804 is operational to transmit, process, and receive call signaling. The TCAP, SCCP, ISUP, and INAP functionality use the services of the MTP to transmit and receive the messages. Preferably, the signaling interface 804 transmits and receives SS7 messages for MTP, TCAP, SCCP, and ISUP. Together, this functionality is referred to as an "SS7 stack," and it is well known. The software required by one skilled in the art to configure an SS7 stack is commercially available. One example is the OMNI SS7 stack from Dale, Gesek, McWilliams & Sheridan, Inc. (the DGM&S company).

The processes of the signaling interface 804 process information that is received in message signal units (MSUs) and convert the information to call information elements that are sent to the call processor 808 to be processed. A call information element may be, for example, an ISUP IAM message parameter from the MSU. The signaling interface 804 strips the unneeded header information from the MSU to isolate the message information parameters and passes the parameters to the call processor 808 as the call information elements. Examples of these parameters are the called number, the calling number, and user service information. Other examples of messages with information elements are an ANM, an ACM, an REL, an RLC, and an INF. In addition, call information elements are transferred from the call processor 808 back to the signaling interface 804, and the information elements are reassembled into MSUs and transferred to a signaling point.

The CPCS 806 is a management and administration system. The CPCS 806 is the user interface and external systems interface into the call processor 808. The CPCS 806 serves as a collection point for call-associated data such as logs, operational measurement data, statistical information, accounting information, and other call data. The CPCS 806 can configure the call-associated data and/or transmit it to reporting centers.

The CPCS 806 accepts data, such as the translations, from a source such as an operations system and updates the data in the tables in the call processor 808. The CPCS 806 ensures that this data is in the correct format prior to transferring the data to the call processor 808. The CPCS 806 also provides configuration data to other devices including the call processor 808, the signaling interface 804, the interworking unit (not shown), and the controllable ATM matrix (not shown). In addition, the CPCS 806 provides for remote control of call monitoring and call tapping applications from the call processor 808.

The CPCS 806 also serves as a collection point for alarms. Alarm information is transferred to the CPCS 806. The CPCS 806 then transports alarm messages to the required communication device. For example, the CPCS 806 can transport alarms to an operations center.

The CPCS 806 also has a human-machine interface (HMI). This allows a person to log onto the CPCS 806 and manage data tables or review data tables in the CPCS or provide maintenance services.

The call processor 808 processes call signaling and controls an ATM interworking unit, such as an ATM interworking multiplexer (mux) that performs interworking of DS0s and VP/VCs, and an ATM matrix. However, the call processor 808 may control other communications devices and connections in other embodiments.

The call processor 808 comprises a control platform 822 and an application platform 824. Each platform 822 and 824 is coupled to the other platform.

The control platform 822 is comprised of various external interfaces including an interworking unit interface, a controllable ATM matrix, an echo interface, a resource control interface, a call information interface, and an operations interface. The control platform 822 is externally coupled to an interworking unit control, a controllable ATM matrix control, an echo control, a resource control, accounting, and operations. The interworking unit interface exchanges messages with at least one interworking unit. These messages comprise DS0 to VP/VC assignments, acknowledgments, and status information. The controllable ATM matrix interface exchanges messages with at least one controllable ATM matrix. These messages comprise DS0 to VP/VC assignments, VP/VC to VP/VC assignments, acknowledgments, and status information. The echo control interface exchanges messages with echo control systems. Messages exchanged with echo control systems might include instructions to enable or disable echo cancellation on particular DS0s, acknowledgments, and status information.

The resource control interface exchanges messages with external resources. Examples of such resources are devices that implement continuity testing, encryption, compression, tone detection/transmission, voice detection, and voice messaging. The messages exchanged with resources are instructions to apply the resource to particular DS0s, acknowledgments, and status information. For example, a message may instruct a continuity testing resource to provide a loopback or to send and detect a tone for a continuity test.

The call information interface transfers pertinent call information to a call information processing system, such as to the CPCS 806. Typical call information includes accounting information, such as the parties to the call, time points for the call, and any special features applied to the call. One skilled in the art will appreciate how to produce the software for the interfaces in the control platform 822.

The application platform 824 processes signaling information from the signaling interface 804 to select connections. The identity of the selected connections are provided to the control platform 822 for the interworking unit interface and/or for the controllable ATM matrix interface. The application platform 824 is responsible for validation, translation, routing, call control, exceptions, screening, and error handling. In addition to providing the control requirements for the interworking unit and the controllable ATM matrix, the application platform 824 also provides requirements for echo control and resource control to the appropriate interface of the control platform 822. In addition, the application platform 824 generates signaling information for transmission by the signaling interface 804. The signaling information might be for ISUP, INAP, or TCAP messages to external network elements. Pertinent information for each call is stored in an enhanced circuit data block (ECDB) for the call. The ECDB can be used for tracking and accounting the call.

The application platform 824 preferably operates in general accord with the Basic Call State Model (BCSM) defined by the ITU. An instance of the BCSM is created to handle each call. The BCSM includes an originating process and a terminating process. The application platform 824 includes a service switching function (SSF) that is used to invoke the service control function (SCF). Typically, the SCF is contained in an SCP. The SCF is queried with TCAP or INAP messages that are transported by the signaling interface 804 and which are initiated with information from the SSF in the application platform 824. The originating or terminating processes will access remote databases with intelligent network (IN) functionality via the SSF.

Software requirements for the application platform 824 can be produced in specification and description language (SDL) defined in ITU-T Z. 100 or similar logic or description languages. The SDL can be converted into C code. A real time case tool such as SDT from Telelogic, Inc. or Object Time from Object Time, Inc. can be used. Additional C and C++ code can be added as required to establish the environment. It will be appreciated that other software languages and tools may be used.

The call processor 808 can be comprised of the above-described software loaded onto a computer. The computer can be a generally available fault-tolerant Unix computer, such as those provided by Sun, Tandem, or Hewlett Packard. It may be desirable to utilize the multi-threading capability of a Unix operating system.

From FIG. 8, it can be seen that the application platform 824 processes signaling information to control numerous systems and facilitate call connections and services. The SS7 signaling is exchanged between the call processor 808 and external components through the signaling interface 804, and control information is exchanged with external systems through the control platform 822. Advantageously, the signaling interface 804, the CPCS 806, and the call processor 808 are not integrated into a switch central processing unit (CPU) that is coupled to a switching matrix. Unlike an SCP, the components of the signaling processor 802 are capable of processing ISUP messages independently of TCAP queries.

SS7 Message Designations

SS7 messages are well known. Designations for various SS7 messages commonly are used. Those skilled in the art are familiar with the following message designations:

ACM—Address Complete Message

ANM—Answer Message

BLO—Blocking

BLA—Blocking Acknowledgment

CPG—Call Progress

CGB—Circuit Group Blocking

CGBA—Circuit Group Blocking Acknowledgment

GRS—Circuit Group Reset

GRA—Circuit Group Reset Acknowledgment

CGU—Circuit Group Unblocking

CGUA—Circuit Group Unblocking Acknowledgment

CQM—Circuit Group Query
CQR—Circuit Group Query Response
CRM—Circuit Reservation Message
CRA—Circuit Reservation Acknowledgment
CVT—Circuit Validation Test
CVR—Circuit Validation Response
CFN—Confusion
COT—Continuity
CCR—Continuity Check Request
EXM—Exit Message
INF—Information
INR—Information Request
IAM—Initial Address Message
LPA—Loop Back Acknowledgment
PAM—Pass Along Message
REL—Release
RLC—Release Complete
RSC—Reset Circuit
RES—Resume
SUS—Suspend
UBL—Unblocking
UBA—Unblocking Acknowledgment
UCIC—Unequipped Circuit Identification Code.

Call Processor Tables

Call processing typically entails two aspects. First, an incoming or "originating" connection is recognized by an originating call process. For example, the initial connection that a call uses to enter a network is the originating connection in that network. Second, an outgoing or "terminating" connection is selected by a terminating call process. For example, the terminating connection is coupled to the originating connection in order to extend the call through the network. These two aspects of call processing are referred to as the originating side of the call and the terminating side of the call.

Figure 9:
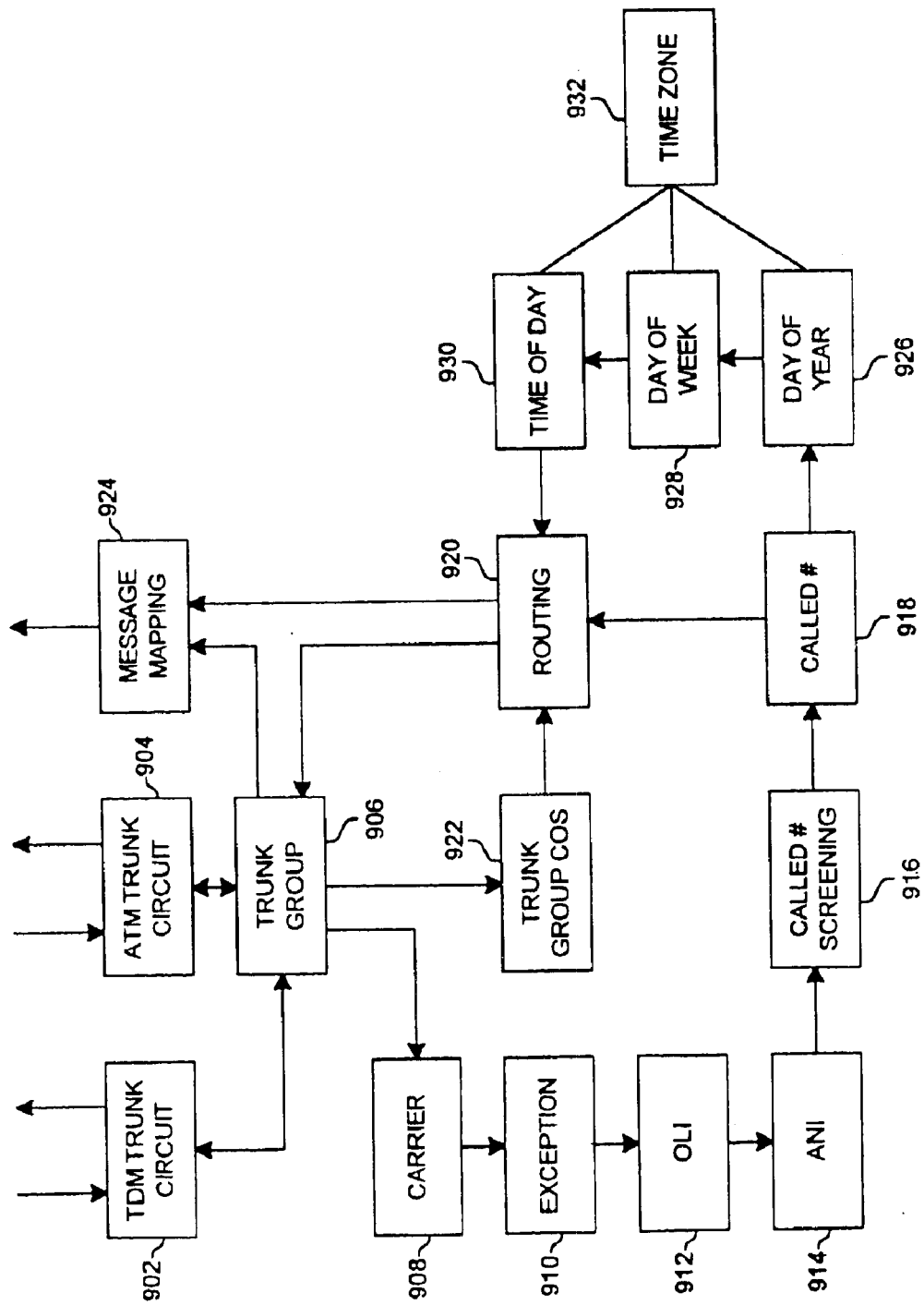
FIG. 9 is a block diagram of a data structure having tables that are used in the signaling processor of FIG. 8.

FIG. 9 depicts an exemplary data structure preferably used by the call processor 802 of FIG. 8 to execute the BCSM. This is accomplished through a series of tables that point to one another in various ways. The pointers typically are comprised of next function and next label designations. The next function points to the next table, and the next label points to an entry or a range of entries in that table. It will be appreciated that the pointers for the main call processing are illustrated in FIG. 9.

The primary data structure has a TDM trunk circuit table 902, an ATM trunk circuit table 904, a trunk group table 906, a carrier table 908, an exception table 910, an originating line information (OLI) table 912, an automatic number identification (ANI) table 914, a called number screening table 916, a called number table 918, a routing table 920, a trunk group class of service (COS) table 922, and a message mapping table 924. Also included in the data structure are a day of year table 926, a day of week table 928, a time of day table 930, and a time zone table 932.

The TDM trunk circuit table 902 contains information required to provision the TDM side of a connection from the call processor site. Each circuit on the TDM side of a connection has an entry. The TDM trunk circuit table 902 is accessed from the trunk group table 906 or an external call process, and it points to the trunk group table.

The ATM trunk circuit table 904 contains information required to provision the ATM side of a connection. Typically, one record appears in this table per ATM trunk group. Although, the system can be configured alternately for multiple records per trunk group. The ATM trunk circuit table 904 is accessed from the trunk group table 906 or an external call process, and it points to the trunk group table.

The trunk group table 906 contains information that is required to build trunk groups out of different trunk members identified in the TDM and ATM trunk circuit tables 902 and 904. The trunk group table 906 contains information related to the originating and terminating trunk groups. The trunk group table 906 typically points to the carrier table 908. Although, the trunk group table 906 may point to the exception table 910, the OLI table 912, the ANI table 914, the called number screening table 916, the called number table 918, the routing table 920, the day of year table 926, the day of week table 928, the time of day table 930, and the treatment table (see FIG. 10).

For default processing of an IAM of an outgoing call in the forward direction, when the call process determines call setup and routing parameters for user communications on the originating portion, the trunk group table 906 is the next table after the TDM and ATM trunk circuit tables 902 and 904, and the trunk group table points to the carrier table 908. For default processing of an LAM of an outgoing call in the forward direction, when the call process determines call setup and routing parameters for user communications on the terminating portion, the trunk group table 906 is the next table after the routing table 920, and the trunk group table points to the TDM or ATM trunk circuit table 902 or 904. For default processing of an ACM or an ANM of an outgoing call in the originating direction, when the call process determines parameters for signaling, the trunk group table 906 is the next table after the TDM or ATM trunk circuit table 902 or 904, and the trunk group table points to the message mapping table 924. It will be appreciated that this is the default method, and, as explained herein, other implementations of table processing occur.

The carrier table 908 contains information that allows calls to be screened based, at least in part, on the carrier information parameter and the carrier selection parameter. The carrier table 908 typically points to the exception table 910. Although, the carrier table 908 may point to the OLI table 912, the ANI table 914, the called number screening table 916, the called number table 918, the routing table 920, the day of year table 926, the day of week table 928, the time of day table 930, the treatment table (see FIG. 10), and the database services table (see FIG. 11).

The exception table 910 is used to identify various exception conditions related to the call that may influence the routing or handling of the call. The exception table 910 contains information that allows calls to be screened based, at least in part, on the called party number and the calling party's category. The exception table 910 typically points to the OLI table 912. Although, the exception table 910 can point to the ANI table 914, the called number screening table 916, the called number table 918, the routing table 920, the day of year table 926, the day of week table 928, the time of day table 930, the call rate table, the percent control table, the treatment table (see FIG. 10), and the database services table (see FIG. 11).

The OLI table 912 contains information that allows calls to be screened based, at least in part, on originating line information in an LAM. The OLI table 912 typically points to the ANI table 914. Although, the OLI table can point to the called number screening table 916, the called number table 918, the routing table 920, the day of year table 926, the day of week table 928, the time of day table 930, and the treatment table (see FIG. 10).

The ANI table 914 is used to identify any special characteristics related to the caller's number, which is commonly known as automatic number identification. The ANI table 914 is used to screen and validate an incoming ANI. ANI specific requirements such as queuing, echo cancellation, time zone, and treatments can be established. The ANI table 914 typically points to the called number screening table 916. Although, the ANI table 914 can point to the called number table 918, the routing table 920, the day of year table 926, the day of week table 928, the time of day table 930, and the treatment table (see FIG. 10).

The called number screening table 916 is used to screen called numbers. The called number screening table 916 determines the disposition of the called number and the nature of the called number. The called number screening table 916 is used to provide the trigger detection point (TDP) for an AIN SCP TCAP query. It is used, for example, with the local number portability (LNP) feature. The called number screening table can invoke a TCAP. The called number screening table 916 typically points to the called number table 918. Although, the called number screening table 916 can point to the routing table 920, the treatment table, the call rate table, the percent table (see FIG. 10), and the database services table (see FIG. 11).

The called number table 918 is used to identify routing requirements based on, for example, the called number. This will be the case for standard calls. The called number table 918 typically points to the routing table 910. In addition, the called number table 926 can be configured to alternately point to the day of year table 926. The called number table 918 can also point to the treatment table (see FIG. 10) and the database services table (see FIG. 11).

The routing table 920 contains information relating to the routing of a call for various connections. The routing table 920 typically points to the treatment table (see FIG. 10). Although, the routing table also can point to the trunk group table 906 and the database services table (see FIG. 11).

For default processing of an IAM of an outgoing call in the forward direction, when the call process determines call setup and routing parameters for user communications, the routing table 920 is the next table after the called number table 918, and the routing table points to the trunk group table 906. For default processing of an LAM of an outgoing call in the forward direction, when the call process determines parameters for signaling, the routing table 920 is the next table after the called number table 918, and the routing table points to the message mapping table 924. It will be appreciated that this is the default method, and, as explained herein, other implementations of table processing occur.

The trunk group COS table 922 contains information that allows calls to be routed differently based on the class of service assigned to the originating trunk group and to the terminating trunk group. The trunk group COS table can point to the routing table 920 or the treatment table (see FIG. 10).

When the trunk group COS table 922 is used in processing, after the routing table 920 and the trunk group table 906 are processed, the trunk group table points to the trunk group COS table. The trunk group COS table points back to the routing table 920 for further processing. Processing then continues with the routing table 920 which points to the trunk group table 906, and the trunk group table which points to the TDM or ATM trunk circuit table 902 or 904. It will be appreciated that this is the default method, and, as explained herein, other implementations of table processing occur.

The message mapping table 924 is used to provide instructions for the formatting of signaling messages from the call processor. It typically can be accessed by the routing table 920 or the trunk group table 906 and typically determines the format of the outgoing messages leaving the call processor.

The day of year table 926 contains information that allows calls to be routed differently based on the day of the year. The day of year table typically points to the routing table 920 and references the time zone table 932 for information. The day of year table 926 also can point to the called number screening table 916, the called number table 918, the routing table 920, the day of week table 928, the time of day table 930, and the treatment table (see FIG. 10).

The day of week table 928 contains information that allows calls to be routed differently based on the day of the week. The day of week table typically points to the routing table 920 and references the time zone table 932 for information. The day of week table 928 also can point to the called number screening table 916, the called number table 918, the time of day table 930, and the treatment table (see FIG. 10).

The time of day table 930 contains information that allows calls to be routed differently based on the time of the day. The time of day table 930 typically points to the routing table 920 and references the time zone table 932 for information. The time of day table 930 also can point to the called number screening table 916, the called number table 918, and the treatment table (see FIG. 10).

The time zone table 932 contains information that allows call processing to determine if the time associated with the call processing should be offset based on the time zone or daylight savings time. The time zone table 932 is referenced by, and provides information to, the day of year table 926, the day of week table 928, and the time of day table 930.

Figure 10:
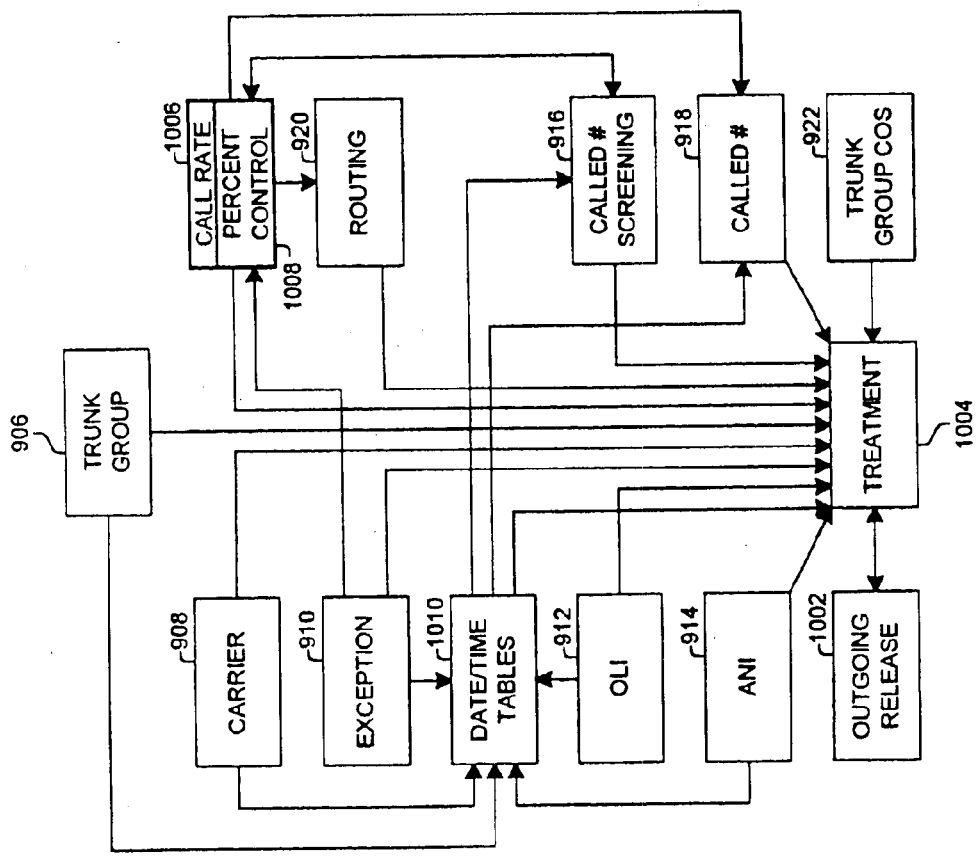
FIG. 10 is a block diagram of additional tables that are used in the signaling processor of FIG. 8.

FIG. 10 is an overlay of FIG. 9. The tables from FIG. 9 are present. However, for clarity, the table's pointers have been omitted, and some tables have not been duplicated in FIG. 10. FIG. 10 illustrates additional tables that can be accessed from the tables of FIG. 9. These include an outgoing release table 1002, a treatment table 1004, a call rate table 1006, and a percent control table 1008, and time/date tables 1010.

The outgoing release table 1002 contains information that allows call processing to determine how an outgoing release message is to be formatted. The outgoing release table 1002 typically points to the treatment table 1006.

The treatment table 1004 identifies various special actions to be taken in the course of call processing. For example, based on the incoming trunk group or ANI, different treatments or cause codes are used to convey problems to the called and calling parties. This typically will result in the transmission of a release message (REL) and a cause value. The treatment table 1004 typically points to the outgoing release table 1002 and the database services table (see FIG. 11).

The call rate table 1006 contains information that is used to control call attempts on an attempt per second basis. Preferably, attempts from 100 per second to 1 per minute are programmable. The call rate table 1006 typically points to the called number screening table 916, the called number table 918, the routing table 920, and the treatment table 1004.

The percent control table 1008 contains information that is used to control call attempts based upon a percent value of the traffic that is processed through call processing. The percent control table 1008 typically points to the called number screening table 916, the called number table 918, the routing table 920, and the treatment table 1004.

The date/time tables 1010 have been identified in FIG. 9 as the day of year table 926, the day of week table 928, the time of day table 926, and the time zone table 932. They are illustrated in FIG. 10 as a single location for ease and clarity but need not be so located.

Figure 11:
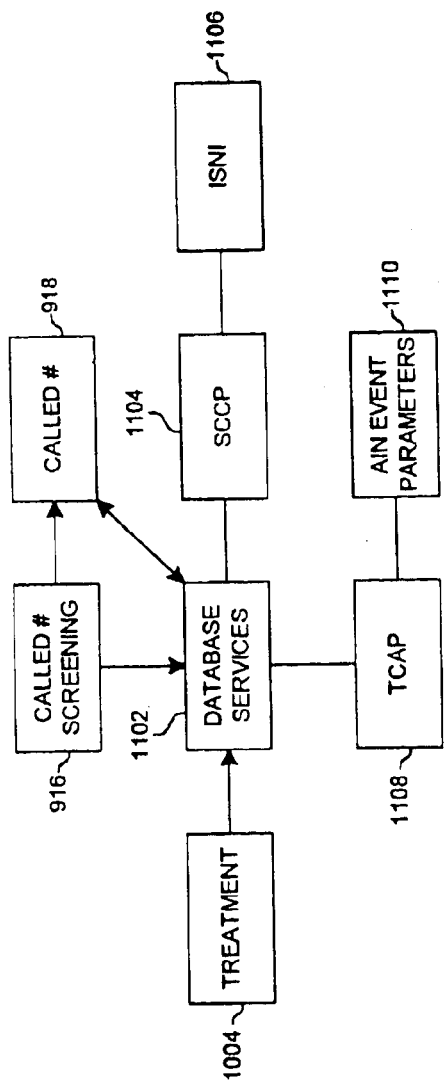
FIG. 11 is a block diagram of additional tables that are used in the signaling processor of FIG. 8.

FIG. 11 is an overlay of FIGS. 9–10. The tables from FIGS. 9–10 are present. However, for clarity, the table's pointers have been omitted, and some tables have not been duplicated in FIG. 11.

FIG. 11 illustrates additional tables that can be accessed from the tables of FIGS. 9–10 and which are directed to the TCAP and the SCCP message processes. These include a database services table 1102, a signaling connection control part (SCCP) table 1104, an intermediate signaling network identification (ISNI) table 1106, a transaction capabilities application part (TCAP) table 1108, and an advanced intelligent network (AIN) event parameters table 1110.

The database services table 1102 contains information about the type of database service requested by call processing. The database services table 1102 references and obtains information from the SCCP table 1104 and the TCAP table 1108. After the database function is performed, the call is returned to normal call processing. The database services table 1102 points to the called number table 918.

The SCCP table 1104 contains information and parameters required to build an SCCP message. The SCCP table 1104 is referenced by the database services table 1102 and provides information to the database services table.

The ISNI table 1106 contains network information that is used for routing SCCP message to a destination node. The ISNI table 1106 is referenced by the SCCP table 1104 and provides information to the SCCP table.

The TCAP table 1108 contains information and parameters required to build a TCAP message. The TCAP table 1108 is referenced by the database services table 1102 and provides information to the database services table.

The AIN event parameters table 1110 contains information and parameters that are included in the parameters portion of a TCAP event message. The AIN event parameters table 1110 is referenced by the TCAP table 1108 and provides information to the TCAP table.

Figure 12:
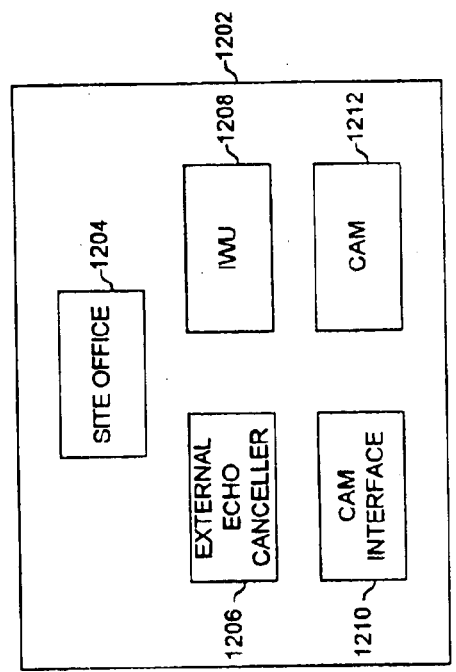
FIG. 12 is a block diagram of additional tables that are used in the signaling processor of FIG. 8.

FIG. 12 is an overlay of FIGS. 9–11. The tables from FIGS. 9–11 are present. However, for clarity, the tables have not been duplicated in FIG. 12. FIG. 12 illustrates additional tables that can be used to setup the call process so that the tables of FIGS. 9–11 may be used. These setup tables 1202 include a site office table 1204, an external echo canceller table 1206, an interworking unit (IWU) table 1208, a controllable ATM matrix (CAM) interface table 1210, and a controllable ATM matrix (CAM) table 1212.

The site office table 1204 contains information which lists office-wide parameters, some of which are information-based and others which affect call processing. The site office table 1204 provides information to the call processor or switch during initialization or other setup procedures, such as population of data or transfer of information to one or more memory locations for use during call processing.

The external echo canceller 1206 contains information that provides the interface identifier and the echo canceller type when an external echo canceller is required. The external echo canceller table 1206 provides information to the call processor or switch during initialization or other setup procedures, such as population of data or transfer of information to one or more memory locations for use during call processing.

The IWU table 1208 contains the internet protocol (EP) identification numbers for interfaces to the interworking units at the call processor or switch site. The IWU table 1208 provides information to the call processor or switch during initialization or other setup procedures, such as population of data or transfer of information to one or more memory locations for use during call processing.

The CAM interface table 1210 contains information for the logical interfaces associated with the CAM. The CAM interface table 1210 provides information to the call processor or switch during initialization or other setup procedures, such as population of data or transfer of information to one or more memory locations for use during call processing.

The CAM table 1212 contains information associated with the logical and physical setup properties of the CAM. The CAM table 1212 provides information to the call processor or switch during initialization or other setup procedures, such as population of data or transfer of information to one or more memory locations for use during call processing.

FIGS. 13–42 depict examples of the various tables described above. It will be appreciated that other versions of tables may be used. In addition, information from the identified tables may be combined or changed to form different tables.

FIG. 13 depicts an example of a TDM trunk circuit table. The TDM trunk circuit table is used to access information about the originating circuit for originating circuit call processing. It also is used to provide information about the terminating circuit for terminating circuit call processing. The trunk group number of the circuit associated with the call is used to enter the table. The group member is the second entry that is used as a key to identify or fill information in the table. The group member identifies the member number of the trunk group to which the circuit is assigned, and it is used for the circuit selection control.

The table also contains the trunk circuit identification code (TCIC). The TCIC identifies the trunk circuit which is typically a DS0. The echo canceller (EC) label entry identifies the echo canceller, if any, which is connected to the circuit. The interworking unit (IWU) label and the interworking unit (IWU) port identify the hardware location and the port number, respectively, of the interworking unit. The DS1/E1 label and the DS1/E1 channel denote the DS1 or the E1 and the channel within the DS1 or E1, respectively, that contains the circuit. The initial state specifies the state of the circuit when it is installed. Valid states include blocked if the circuit is installed and blocked from usage, unequipped if the circuit is reserved, and normal if the circuit is installed and available from usage.

FIG. 14 depicts an example of an ATM trunk circuit table. The ATM trunk circuit table is used to access information about the originating circuit for originating circuit call processing. It also is used to provide information about the terminating circuit for terminating circuit call processing.

The trunk group number of the circuit associated with the call is used to enter the table. The group size denotes the number of members in the trunk group. The starting trunk circuit identification code (TCIC) is the starting TCIC for the trunk group, and it is used in the routing label of an ISUP message. The transmit interface label identifies the hardware location of the virtual path on which the call will be transmitted. The transmit interface label may designate either an interworking unit interface or a CAM interface for the designated trunk members. The transmit virtual path identifier (VPI) is the VP that will be used on the transmission circuit side of the call. The receive interface label identifies the hardware location of the virtual path on which the call will be received. The receive interface label may designate either an interworking unit interface or a CAM interface for the designated trunk members. The receive virtual path identifier (VPI) is the VP that will be used on the reception circuit side of the call. The initial state specifies the state of the circuit when it is installed. Valid states include blocked if the circuit is installed and blocked from usage, unequipped if the circuit is reserved, and normal if the circuit is installed and available from usage.

FIG. 15A depicts an example of a trunk group table. The trunk group number of the trunk group associated with the circuit is used to key into the trunk group table. The administration information field is used for information purposes concerning the trunk group and typically is not used in call processing. The associated point code is the point code for the far end switch or call processor to which the trunk group is connected. The common language location identifier (CLLI) entry is a standardized Bellcore entry for the associated office to which the trunk group is connected. The trunk type identifies the type of the trunk in the trunk group. The trunk type may be a TDM trunk, an ATM trunk from the interworking unit, or an ATM trunk from the CAM.

The associated numbering plan area (NPA) contains information identifying the switch from which the trunk group is originating or to which the trunk group is terminating. The associated jurisdiction information parameter (JIP) contains information identifying the switch from which the trunk group is originating or to which the trunk group is terminating. If an ISUP JIP is not received in an LAM, the default JIP is a value recorded on the call processor ECDB. If an incoming IAM does not have a JIP, call processing will populate the JIP of the outgoing IAM with the default value from the trunk group table. If a JIP is not data filled, an outgoing JIP is not transmitted.

The time zone label identifies the time zone that should be used when computing a local date and a local time for use with a day of year table, the day of week table, and the time of day table. The echo canceller information field describes the trunk group echo cancellation requirements. Valid entries for the echo canceller information include normal for a trunk group that uses internal echo cancellation, external for a trunk group that requires external echo cancellers, and disable for a trunk group that requires no echo cancellation for any call passing over the group.

FIG. 15B is a continuation of FIG. 15A for the trunk group table. The satellite entry specifies that the trunk group for the circuit is connected through a satellite. If the trunk group uses too many satellites, then a call should not use the identified trunk group. This field is used in conjunction with the nature of connection satellite indicator field from the incoming IAM to determine if the outgoing call can be connected over this trunk group. The select sequence indicates the methodology that will be used to select a connection. Valid entries for the select sequence field include the following: most idle, least idle, ascending, or descending. The interworking unit (IWU) priority signifies that outgoing calls will attempt to use a trunk circuit on the same interworking unit before using a trunk circuit on a different interworking unit.

Glare resolution indicates how a glare situation is to be resolved. Glare is the dual seizure of the same circuit. If the glare resolution entry is set to "even/odd," the switch or the call processor with the higher point code value will control the even number TCICs within the trunk group. The switch or call processor with the lower point code value will control the odd number TCICs. If the glare resolution entry is set to "all," the call processor controls all of the TCICs within the trunk group. If the glare resolution entry is set to "none," the call processor will have no glare control and will yield to all double seizures within the trunk group.

Continuity control indicates whether continuity is to be checked. Continuity for outgoing calls on the originating call processor are controlled on a trunk group basis. This field specifies whether continuity is not required or whether continuity is required and the frequency of the required check. The field identifies a percentage of the calls that require continuity check.

The reattempt entry specifies how many times the outgoing call will be re-attempted using a different circuit from the same trunk group after a continuity check failure, a glare, or other connection failure. The ignore local number portability (LNP) information specifies whether or not the incoming LNP information is ignored. The treatment label is a label into the treatment table for the trunk group used on the call. Because specific trunk group connections may require specific release causes or treatments for a specific customer, this field identifies the type of treatment that is required. The message mapping label is a label into the message mapping table which specifies the backward message configuration that will be used on the trunk group.

FIG. 15C is a continuation of FIG. 15B for the trunk group table. The queue entry signifies that the terminating part of the trunk group is capable of queuing calls originating from a subscriber that called a number which terminates in this trunk group. The ring no answer entry specifies whether the trunk group requires ring no answer timing. If the entry is set to 0, the call processing will not use the ring no answer timing for calls terminated on the trunk group. A number other than 0 specifies the ring no answer timing in seconds for calls terminating on this trunk group. The voice path cut through entry identifies how and when the terminating call's voice path will be cut through on the trunk group. The options for this field include the following: connect for a cut through in both directions after receipt of an ACM, answer for cut through in the backward direction upon receipt of an ACM, then cut through in the forward direction upon receipt of an ANM, or immediate for cut through in both directions immediately after an IAM has been sent.

The originating class of service (COS) label provides a label into a class of service table that determines how a call is handled based on the combination of the originating COS and the terminating COS from another trunk group. Based on the combination of this field and the terminating COS of another trunk group's field, the call will be handled differently. For example, the call may be denied, route advanced, or otherwise processed. The terminating class of service (COS) label provides a label into a class of service table that determines how a call is handled based on the combination of the originating COS from another trunk group and the terminating COS from the present trunk group. Based on a combination of this field and the originating COS the call will be handled differently. For example, the call may be denied, route advanced, or otherwise processed.

Call control provides an index to a specific trunk group level traffic management control. Valid entries include normal for no control applied, skip control, applied wide area telecommunications service (WATS) reroute functionality, cancel control, reroute control overflow, and reroute immediate control. The next function points to the next table, and the next label points to an entry or a range of entries in that table.

FIG. 16 depicts an example of a carrier table. The carrier label is the key to enter the table. The carrier identification (ID) specifies the carrier to be used by the calling party. The carrier selection entry identifies how the caller specifies the carrier. For example, it identifies whether the caller dialed a prefix digit or whether the caller was pre-subscribed. The carrier selection is used to determine how the call will be routed. The next function points to the next table, and the next label defines an area in that table for further call processing.

FIG. 17 depicts an example of an exception table. The exception label is used as a key to enter the table. The calling party's category entry specifies how to process a call from an ordinary subscriber, an unknown subscriber, or a test phone. The called number nature of address differentiates between 0+ calls, 1+ calls, test calls, local routing number (LRN) calls, and international calls. For example, international calls might be routed to a pre-selected international carrier. The called number "digits from" and "digits to" focus further processing unique to a defined range of called numbers. The "digits from" field is a decimal number ranging from 1–15 digits. It can be any length and, if filled with less than 15 digits, is filled with 0s for the remaining digits. The "digits to" is a decimal number ranging from 1–15 digits. It can be any length and, if filled with less than 15 digits, is filled with 9s for the remaining digits. The next function and next label entries point to the next table and the next entry within that table for the next routing function.

FIG. 18 depicts an example of the originating line information (OLI) table. The OLI label is used as a key to enter the table from a prior next function operation. The originating line information entry specifies the information digits that are being transmitted from a carrier. Different calls are differentiated based on the information digits. For example, the information digits may identify an ordinary subscriber, a multi-party line, N00 service, prison service, cellular service, or private pay station. The next function and next label entries point to the next table and the area within that table for the next routing function.

FIG. 19 depicts an example of an automatic number identification (ANI) table. The ANI label is used as a key to enter the table from a prior next option. The charge calling party number "digits from" and "digits to" focus further processing unique to ANI within a given range. These entries are looked at to determine if the incoming calling number falls within the "digits from" and "digits to" fields. The time zone label indicates the entry in the time zone table that should be used when computing the local date and time. The time zone label overrides the time zone information from the trunk group table 906.

The customer information entry specifies further customer information on the originating side for call process routing. The echo cancellation (EC) information field specifies whether or not to apply echo cancellation to the associated ANI. The queue entry identifies whether or not queuing is available to the calling party if the called party is busy. Queuing timers determine the length of time that a call can be queued. The treatment label defines how a call will be treated based on information in the treatment table. For example, the treatment label may send a call to a specific recording based on a dialed number. The next function and next label point to the next table and an area within that table for further call processing.

FIG. 20 depicts an example of a called number screening table. The called number screening label is used as a key to enter the table. The called number nature of address indicates the type of dialed number, for example, national versus international. The nature of address entry allows the call process to route a call differently based on the nature of address value provided. The "digits from" and "digits to" entries focus further processing unique to a range of called numbers. The "digits from" and "digits to" columns both contain called number digits, such as NPA-NXX ranges, that may contain ported numbers and are checked for an LRN. This table serves as the trigger detection point (TDP) for an LNP TCAP when, for example, NPA-NXXs of donor switches that have had subscribers port their numbers are data filled in the "digits from" and "digits to" fields. The delete digits field provides the number of digits to be deleted from the called number before processing continues. The next function and next label point to the next table and the area within that table for further call processing.

FIG. 21 depicts an example of a called number table. The called number label is used as a key to enter the table. The called number nature of address entry indicates the type of dialed number, for example, national versus international. The "digits from" and "digits to" entries focus further processing unique to a range of numbers, including LRNs. The next function and next label point to a next table and the area within that table used for further call processing.

FIG. 22 depicts an example of a day of year table. The day of year label is used as a key to enter the table. The date field indicates the local date which is applicable to the action to be taken during the processing of this table. The next function and next label identify the table and the area within that table for further call processing.

FIG. 23 depicts an example of a day of week table. The day of week label is a key that is used to enter the table. The "day from" field indicates the local day of the week on which the action to be taken by this table line entry is to start. The "day to" field indicates the local day of the week on which the action to be taken by this table line entry is to end. The next function and next label identify the next table and the area within that table for further call processing.

FIG. 24 depicts an example of a time of day table. The time of day label is used as a key to enter the table from a prior next function. The "time from" entry indicates the local time on which an action to be taken is to start. The "time to" field indicates the local time just before which the action to be taken is to stop. The next function and next label entries identify the next table and the area within that table for further call processing.

FIG. 25 depicts an example of a time zone table. The time zone label is used as a key to enter the table and to process an entry so that a customer's local date and time may be computed. The coordinated universal time (UTC) indicates a standard offset of this time zone from the UTC. The UTC is also known as Greenwich mean time, GMT, or Zulu. The UTC should be positive for time zones east of Greenwich, such as Europe and Asia, and negative for time zones west of Greenwich, such as North America The daylight savings entry indicates whether daylight savings time is used during the summer in this time zone.

FIG. 26 depicts an example of a routing table. The routing label is used as a key to enter the table from a prior next function. The route number specifies a route within a route list. Call processing will process the route choices for a given route label in the order indicated by the route numbers. The next function and next label identify the next table and the area within that table for further call processing. The signal route label is associated with the next action to be taken by call processing for this call. The signal route label provides the index to access the message mapping label. The signal route label is used in order to modify parameter data fields in a signaling message that is being propagated to a next switch or a next call processor.

FIG. 27 depicts an example of a trunk group class of service (COS) table. The originating trunk COS label and the terminating trunk COS label are used as keys to enter the table and define call processing. The next function identifies the next action that will be taken by call processing for this call. Valid entries in the next function column may be continued, treat, route advanced, or routing. Based on these entries call processing may continue using the current trunk group, send the calls to treatment, skip the current trunk group and the routing table and go to the next trunk group on the list, or send the call to a different label in the routing table. The next label entry is a pointer that defines the trunk circuit group that the next function will use to process the call. This field is ignored when the next function is continued or route advanced.

FIG. 28 depicts an example of a treatment table. The treatment label is a key that is used to enter the table. The treatment label is a designation in a call process that determines the disposition of the call. The error/cause label correspond either to internally generated error conditions and call processing or to incoming release cause values. For each treatment label, there will be a set of error conditions and cause values that will be associated with a series of labels for the call processing error conditions and a series of labels for all incoming release message cause values. The next function and next label point to the next table and the area within that table for further call processing.

FIG. 29 depicts an example of an outgoing release table. The outgoing release label is used as a key to enter the table for processing. The outgoing cause value location identifies the type of network to be used. For example, the location entry may specify a local or remote network or a private, transit, or international network. The coding standard identifies the standard as an International Telecommunications Union (ITU) standard or an American National Standards Institute (ANSI) standard. The cause value designates error, maintenance, or non-connection processes.

FIG. 30 depicts an example of a percent control table. The percent label is used as a key to enter the table. The control percentage specifies the percentage of incoming calls that will be affected by the control. The control next function allows attempts for call connection to be routed to another table during call processing. The control next label points to an area within that table for further call processing. The passed next function allows only incoming attempts to be routed to another table. The next label points to an area in that table for further call processing.

FIG. 31 depicts an example of a call rate table. The call rate label is used as a key to enter the table. The call rate specifies the number of calls that will be passed by the control on or for completion. Call processing will use this information to determine if the incoming call number falls within this control. The control next function allows a blocked call attempt to be routed to another table. The control next label is a pointer that defines the area in the next table for further call processing. The passed next function allows only an incoming call attempt to be rerouted to another table. The passed next function is a pointer that defines an area in that table for further call processing.

FIG. 32 depicts an example of a database services table. The database services label is used as a key to enter the table. The service type determines the type of logic that is applied when building and responding to database queries. Service types include local number portability and N00 number translation. The signaling connection control part (SCCP) label identifies a location within an SCCP table for further call processing. The transaction capabilities application part (TCAP) label identifies a location within a TCAP table for further processing. The next function identifies the location for the next routing function based on information contained in the database services table as well as information received from a database query. The next label entry specifies an area within the table identified in the next function for further processing.

FIG. 33A depicts an example of a signaling connection control part (SCCP) table. The SCCP label is used as a key to enter the field. The message type entry identifies the type of message that will be sent in the SCCP message. Message types include Unitdata messages and Extended Unitdata messages. The protocol class entry indicates the type of protocol class that will be used for the message specified in the message type field. The protocol class is used for connectionless transactions to determine whether messages are discarded or returned upon an error condition. The message handling field identifies how the destination call processor or switch is to handle the SCCP message if it is received with errors. This field will designate that the message is to be discarded or returned. The hop counter entry denotes the number of nodes through which the SCCP message can route before the message is returned with an error condition. The segmentation entry denotes whether or not this SCCP message will use segmentation and send more than one SCCP message to the destination.

FIG. 33B is a continuation of FIG. 33A for the SCCP table. The intermediate signaling network identification (ISNI) fields allow the SCCP message to traverse different networks in order to reach a desired node. The ISNI type identifies the type of ISNI message format that will be used for this SCCP message. The route indicator subfield identifies whether or not this SCCP message requires a special type of routing to go through other networks. The mark identification subfield identifies whether or not network identification will be used for this SCCP message. The label subfield identifies a unique address into the ISNI table when the route indicator sub-field is set to "constrained" and the mark identification subfield is set to "yes."

FIG. 33C is a continuation of FIG. 33B for the SCCP table. FIG. 33C identifies the called party address field and subfields to provide information on how to route this SCCP message. The address indicator subsystem number (SSN) indicates whether or not a subsystem number will be included in the called party address. The point code entry indicates whether or not a point code will be included in the calling party address. The global title indicator subfield identifies whether or not a global title translation will be used to route the SCCP message. If a global title translation is chosen, this subfield also identifies the type. The routing indicator subfield identifies the elements that will be used to route the message. Valid entries include global title and point code. The national/international subfield identifies whether the SCCP message will use national or international routing and set up.

The subsystem number field identifies the subsystem number for the SCCP message. The point code number indicates the destination point code to which the SCCP message will be routed. This field will be used for routing messages that do not require SCCP translation.

The global title translation field allows intermediate nodes to translate SCCP messages so that the messages can be routed to the correct destination with the correct point code. The global title translation type entry directs the SCCP message to the correct global title translation function. The encode scheme identifies how the address type will be encoded. The number plan subfield identifies the numbering plan that will be sent to the destination node. The address type subfield will identify which address type to use for address digits and the SCCP routing through the network.

FIG. 33D is a continuation of FIG. 33C for the SCCP table. FIG. 33D identifies the calling party address field which contains the routing information that the destination database uses to retain the SCCP message. The address indicator subsystem number (SSN) indicates whether or not a subsystem number will be included in the called party address. The point code subfield indicates whether or not a point code will be included in the calling party address. The global title indicator subfield identifies whether or not global title translation will be used to route the SCCP message. The routing indicator subfield identifies which elements will be used throughout the message. This field may include global title elements or point code elements. The national/international subfield identifies whether the SCCP will use national or international routing and set up.

The subsystem number identifies a subsystem number for the SCCP message. The point code number field indicates the destination point code to which the SCCP message will be routed. The global title translations allow the intermediate nodes to translate SCCP messages and to route the messages to the correct destination. The global title translation type directs the SCCP message to the correct global title translation function. The encode scheme identifies how the address type will be encoded. The number plan identifies the number plan that will be sent to the destination node. The address type subfield identifies the address type to use for address digits in the SCCP routing through the network.

FIG. 34 depicts an example of an intermediate signaling network identification (ISNI) table. The ISNI table contains a list of networks that will be used for routing SCCP messages to the destination node. The ISNI label is used as a key to enter the table. The network fields 1–16 identify the network number of up to 16 networks that may be used for routing the SCCP message.

FIG. 35 depicts an example of a transaction capabilities application part (TCAP) table. The TCAP label is used as a key to enter the table. The TCAP type identifies the type of the TCAP that will be constructed. The TCAP types include advanced intelligent network (AIN) and distributed intelligent network architecture (DINA). The tag class indicates whether the message will use a common or proprietary structure. The package type field identifies the package type that will be used in the transaction portion of the TCAP message. The component type field identifies the component type that will be used in the component portion of the TCAP message. The message type field identifies the type of TCAP message. Message types include variable options depending on whether they are AIN message types or DINA message types.

FIG. 36 depicts an example of an external echo canceller table. The echo canceller type specifies if an external echo canceller is being used on the circuit and, if so, the type of echo canceller. The echo canceller label points to a location in the controllable ATM matrix table for further call processing. The RS-232 address is the address of the RS-232 interface that is used to communicate with the external echo canceller. The module entry is the module number of the external echo canceller.

FIG. 37 depicts an example of an interworking unit interface table. The interworking unit (IWU) is a key that is used to enter the table. The IWU identification (ID) identifies which interworking unit is being addressed. The internet protocol (IP) sockets 1–4 specify the IP socket address of any of the four connections to the interworking unit.

FIG. 38 depicts an example of a controllable ATM matrix (CAM) interface table. The CAM interface label is used as a key to enter the table. The CAM label indicates which CAM contains the interface. The logical interface entry specifies a logical interface or port number in the CAM.

FIG. 39 depicts an example of a controllable ATM matrix (CAM) table. The CAM label is used as a key to enter the table. The CAM type indicates the type of CAM control protocol. The CAM address identifies the address of the CAM.

FIG. 40A depicts an example of a call processor or switch site office table. The office CLLI name identifies a CLLI of the associated office for the call processor or switch. The call processor or switch site node identifier (ID) specifies the call processor or switch node identifier. The call processor or switch origination identifier (ID) specifies a call processor or switch origination identifier. The software identifier (ID) specifies a software release identifier. The call processor identifier (ID) specifies the call processor or switch identifier that is sent to the inter working units.

FIG. 40B is a continuation of FIG. 40A of the call processor or switch site office table. The automatic congestion control (ACC) specifies whether ACC is enabled or disabled. The automatic congestion control level (ACL) 1 onset identifies an onset percentage value of a first buffer utilization. The ACL 1 abate entry specifies an abatement percentage of utilization for a first buffer. The ACL 2 onset entry specifies an onset level for a second buffer. The ACL 2 abate entry specifies an abatement level percentage of buffer utilization for a second buffer. The ACL 3 onset entry specifies an onset level percentage of buffer utilization for a third buffer. The ACL 3 abate entry specifies an abatement level percentage of buffer utilization for a third buffer.

FIG. 40C is a continuation of FIG. 40B for the call processor or switch site office table. The maximum trunks for the off hook queuing (max trunks OHQ) specifies a maximum number of trunk groups that can have the off hook queuing enabled. The OHQ timer one (TQ1) entry specifies the number of milliseconds for the off hook timer number one. The OHQ timer two (TQ2) entry specifies the number of seconds for the off hook timer number two. The ring no answer timer specifies the number of seconds for the ring no answer timer. The billing active entry specifies whether ECDBs are being sent to the call processing control system (CPCS). The network management (NWM) allow entry identifies whether or not a selective trunk reservation and group control are allowed or disallowed. The billing failure free call entry specifies if a call will not be billed if the billing process is unavailable. The billing failure free call will either be enabled for free calls or disabled so that there are no free calls.

FIG. 40D is a continuation of FIG. 40C for the call processor or switch site office table. The maximum (max) hop counts identifies the number of call processor or switch hops that may be made in a single call. The maximum (max) table lookups identifies the number of table lookups that may performed for a single call. This value is used to detect loops in routing tables.

FIGS. 41A–41B depict an example of an advanced intelligent network (AIN) event parameters table. The AIN event parameters table has two columns. The first identifies the parameters that will be included in the parameters portion of the TCAP event message. The second entry may include information for analysis.

FIG. 42 depicts an example of a message mapping table. This table allows the call processor to alter information in outgoing messages. The message type field is used as a key to enter the table and represents the outgoing standard message type. The parameters entry is a pertinent parameter within the outgoing message. The indexes point to various entries in the trunk group and determine if parameters are passed unchanged, omitted, or modified in the outgoing messages.

Those skilled in the art will appreciate that variations from the specific embodiments disclosed above are contemplated by the invention. The invention should not be restricted to the above embodiments, but should be measured by the following claims.

What is claimed is:

1. A system for connecting a call having call signaling and user communications, the system comprising:

a signaling interface adapted to receive and process the call signaling to determine call information elements, to transmit the call information elements, to receive new call information elements, and to transmit the now call information elements as new call signaling;

a call processor adapted to receive the call information elements from the signaling interface, to process the call information elements to determine the new call information elements, to determine a destination for the new call signaling, to select either a Signaling System #7 (SS7) format or a packet signaling format for the new call signaling, and to transfer the new call information elements to the signaling interface in either the SS7 format or the packet signaling format; and an asynchronous transfer mode matrix adapted to receive the new call signaling in the packet signaling format from the signaling interface and to transmit the new call signaling using an asynchronous transfer mode connection.

2. The system of claim 1 wherein the call processor further is adapted to transmit a control message to the asynchronous transfer mode matrix designating the asynchronous transfer mode connection over which to connect the new call signaling; and the asynchronous transfer mode matrix further is adapted to receive the control message and to connect the new call signaling using the asynchronous transfer mode connection in response thereto.

3. The system of claim 1 wherein the asynchronous transfer mode matrix is adapted to connect the new call signaling to the asynchronous transfer mode connection without requiring the call processor to designate the asynchronous transfer mode connection.

4. The system of claim 1 wherein:

the call processor further is adapted to transmit a control message to the asynchronous transfer mode matrix designating the connection for the user communications; and the asynchronous transfer mode matrix further is adapted to receive the user communications, to receive the control message, and to connect the user communications using the connection designated in the control message.

5. The system of claim 4 further comprising a communication device adapted to receive the user communications over the connection.

6. The system of claim 4 wherein the call processor further is adapted to determine a second connection for the user communications and to transmit a second control message designating the second connection, and the system further comprises: an interworking unit adapted to receive the second control message from the call processor, to receive the user communications, and to interwork the user communications to the designated second connection.

7. The system of claim 6 further comprising a communication device adapted to transport the user communications to the interworking unit.

8. The system of claim 1 wherein the signaling interface and the call processor are connected by at least one of a backplane, a bus structure, and a single computer.

9. The system of claim 1 wherein the new call signaling transmitted by the asynchronous transfer mode matrix comprises new call information elements.

10. The system of claim 1 further comprising a call process control system adapted to manage and administer the system.

* * * * *